(12) United States Patent
Jaafar et al.

(10) Patent No.: US 10,048,751 B2
(45) Date of Patent: Aug. 14, 2018

(54) METHODS AND SYSTEMS FOR GAZE-BASED CONTROL OF VIRTUAL REALITY MEDIA CONTENT

(71) Applicant: Verizon Patent and Licensing Inc., Arlington, VA (US)

(72) Inventors: Ali Jaafar, Morristown, NJ (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 15/087,831

(22) Filed: Mar. 31, 2016

(65) Prior Publication Data
US 2017/0285737 A1  Oct. 5, 2017

(51) Int. Cl.
| | |
|---|---|
| *G06F 3/01* | (2006.01) |
| *G06T 19/00* | (2011.01) |
| *G06F 3/0482* | (2013.01) |
| *G06T 15/20* | (2011.01) |
| *G06T 19/20* | (2011.01) |
| *G06F 3/0484* | (2013.01) |
| *G06F 17/30* | (2006.01) |

(52) U.S. Cl.
CPC .............. *G06F 3/013* (2013.01); *G06F 3/011* (2013.01); *G06F 3/0482* (2013.01); *G06F 3/04842* (2013.01); *G06F 17/30781* (2013.01); *G06T 15/20* (2013.01); *G06T 19/20* (2013.01); *G06T 2219/2024* (2013.01)

(58) Field of Classification Search
CPC .............................. G06F 3/013; G06T 19/006
USPC ......................................................... 345/633
See application file for complete search history.

(56) References Cited

U.S. PATENT DOCUMENTS

| | | | | |
|---|---|---|---|---|
| 2004/0103111 | A1* | 5/2004 | Miller ................... | G02B 27/017 |
| 2005/0062869 | A1* | 3/2005 | Zimmermann ........ | G02B 13/06 348/335 |
| 2013/0342572 | A1* | 12/2013 | Poulos ................. | G02B 27/017 345/633 |
| 2014/0372957 | A1* | 12/2014 | Keane ..................... | G06F 3/013 715/852 |
| 2015/0153571 | A1* | 6/2015 | Ballard ................ | G02B 27/017 345/8 |
| 2015/0346832 | A1* | 12/2015 | Cole ................... | H04N 13/0014 345/156 |
| 2015/0373412 | A1* | 12/2015 | Park .................... | G06K 9/00288 725/12 |

(Continued)

*Primary Examiner* — Kimberly A Williams

(57) ABSTRACT

An exemplary virtual reality media system presents a field of view of an immersive virtual reality world on a display screen of a media player device associated with a user. The field of view includes content of the immersive virtual reality world and dynamically changes in response to user input provided by the user as the user experiences the immersive virtual reality world. Additionally, the virtual reality media system detects that a gaze of the user is directed for a predetermined amount of time at a gaze target included within the field of view. In response to the detection, the virtual reality media system presents an interactive user interface associated with the gaze target. In some examples, the interactive user interface is presented within the field of view together with the content of the immersive virtual reality world. Corresponding methods and systems are also described.

20 Claims, 17 Drawing Sheets

(56) References Cited

U.S. PATENT DOCUMENTS

| | | | |
|---|---|---|---|
| 2016/0274762 A1* | 9/2016 | Lopez | G06T 19/006 |
| 2016/0364916 A1* | 12/2016 | Terahata | G02B 27/017 |
| 2017/0011557 A1* | 1/2017 | Lee | G06F 3/013 |
| 2017/0038837 A1* | 2/2017 | Faaborg | G06F 3/0482 |
| 2017/0084084 A1* | 3/2017 | Durham | G06F 3/013 |
| 2017/0109936 A1* | 4/2017 | Powderly | G06F 3/012 |

\* cited by examiner

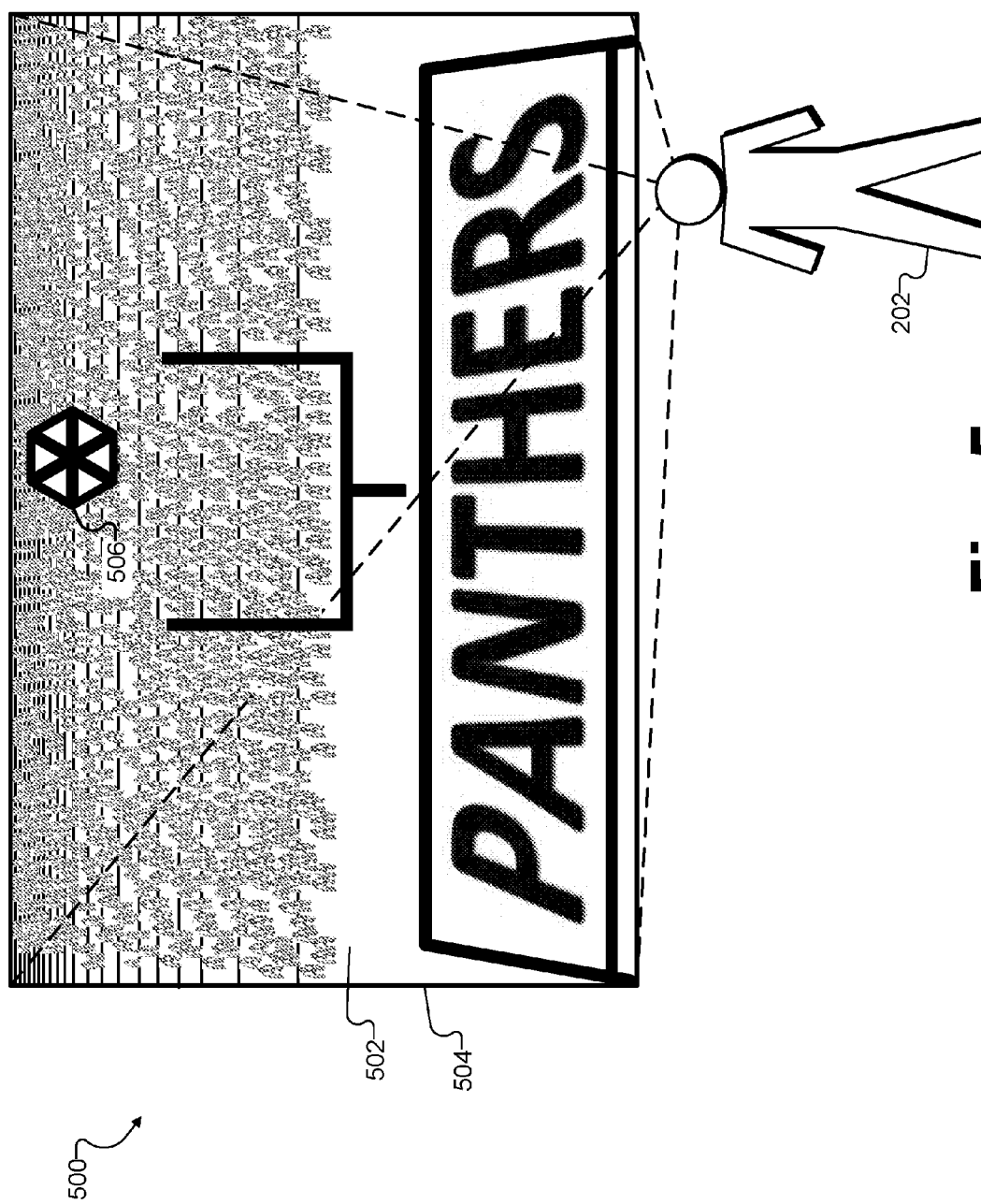

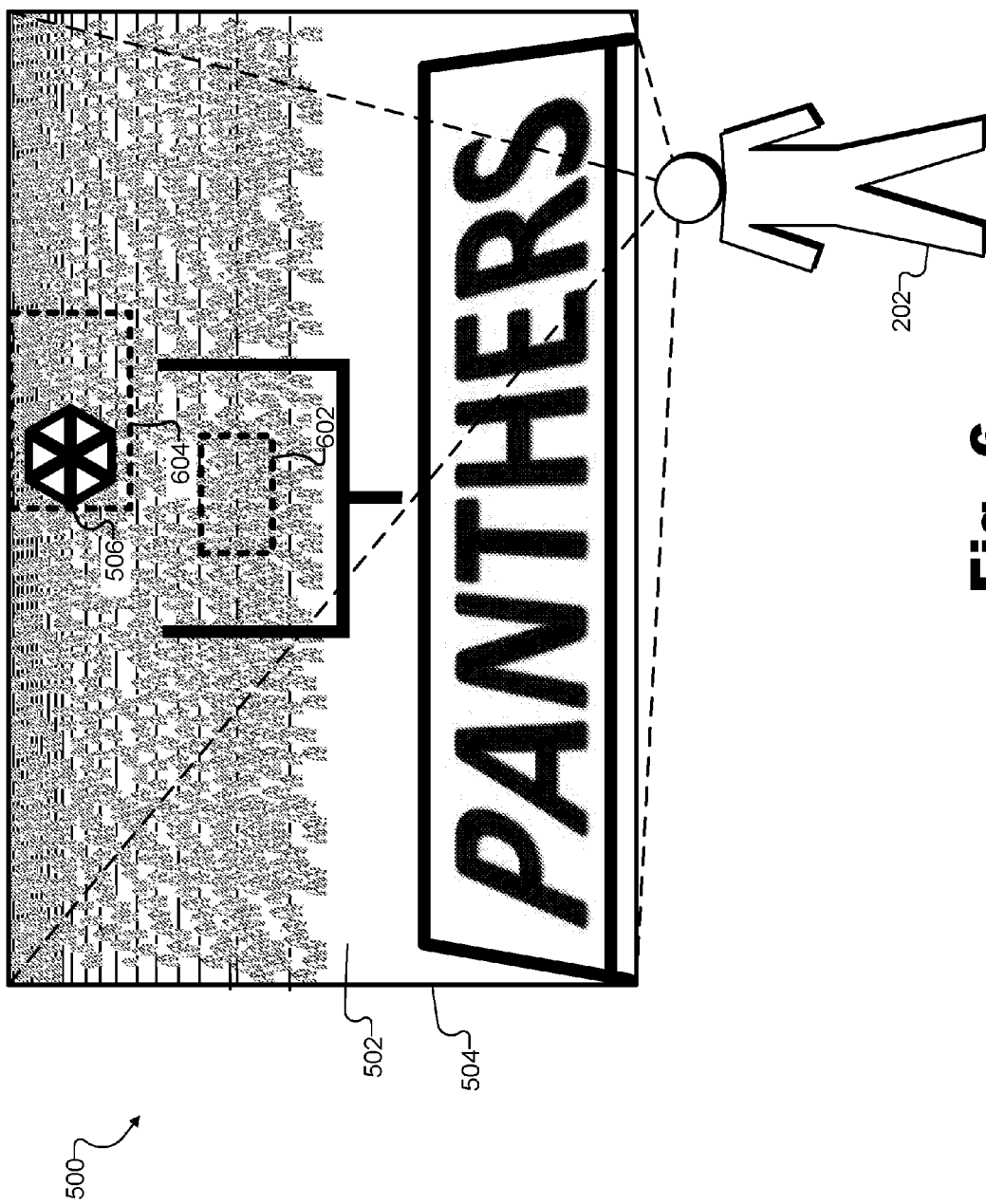

METHODS AND SYSTEMS FOR GAZE-BASED CONTROL OF VIRTUAL REALITY MEDIA CONTENT

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

In some cases, virtual reality media content provides an opportunity for a user to interact with certain elements of an immersive virtual reality world as the user looks around and experiences the immersive virtual reality world. However, such user interaction may require entering user input (e.g., using real-world physical controls such as buttons, mice, trackpads, keyboards, etc.). Unfortunately, users may find entering such user input to be burdensome, inconvenient, unnatural, and/or otherwise detractive from the immersiveness of the virtual reality experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5 and 6 illustrate an exemplary field of view of an immersive virtual reality world that includes an exemplary gaze target according to principles described herein.

DETAILED DESCRIPTION OF PREFERRED EMBODIMENTS

Figure 1:
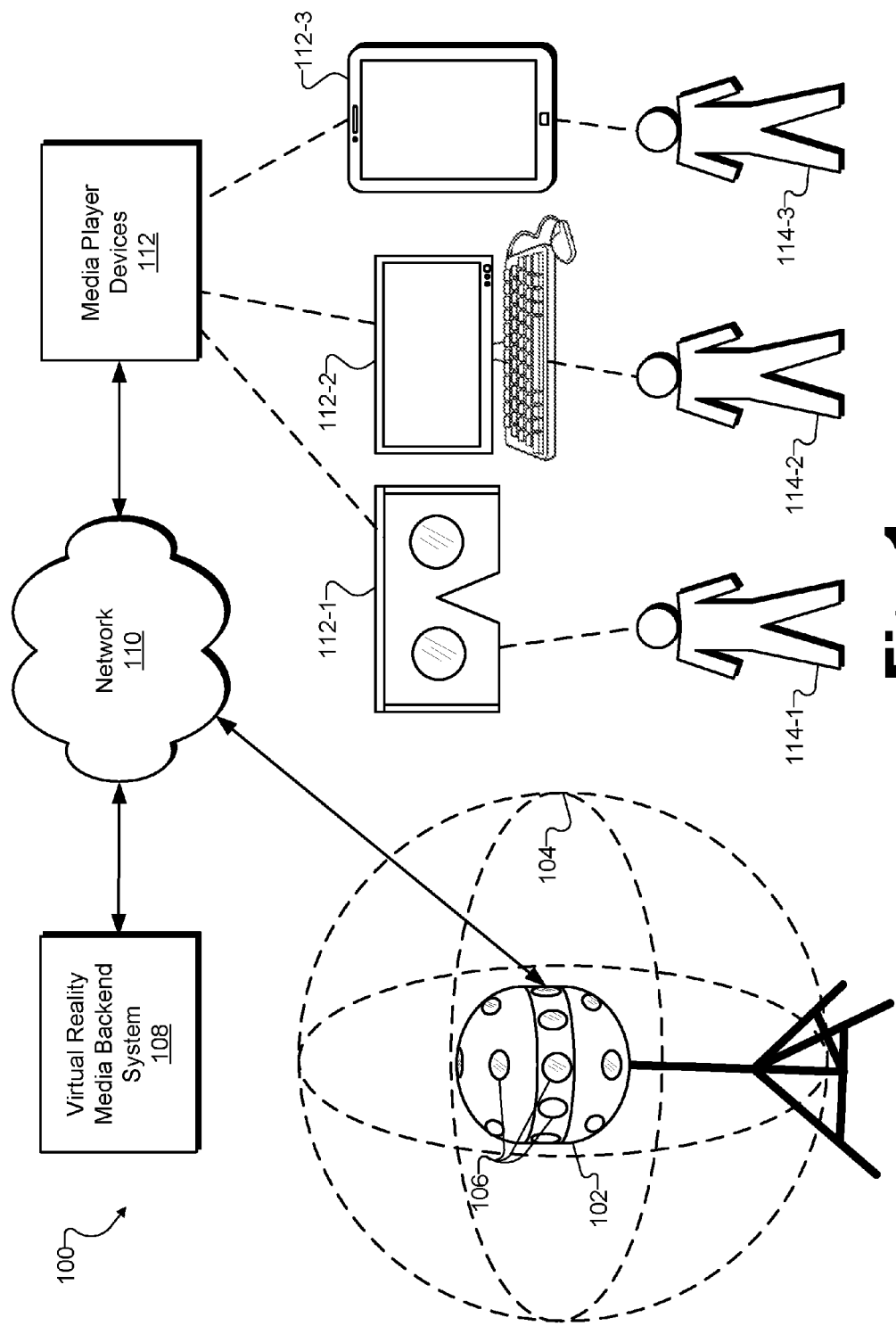
FIG. 1 illustrates an exemplary configuration in which exemplary embodiments of a 360-degree camera, a virtual reality media backend system, and a media player device operate to facilitate gaze-based control of virtual reality media content according to principles described herein.

Methods and systems for gaze-based control of virtual reality media content are described herein. As will be described and illustrated below, a virtual reality media system may present, on a display screen of a media player device associated with a user, a field of view of an immersive virtual reality world. The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

The user may experience the immersive virtual reality world by way of the field of view. For example, the field of view may include content of the immersive virtual reality world (e.g., images depicting scenery and objects surrounding the user within the immersive virtual reality world). Additionally, the field of view may dynamically change in response to user input provided by the user as the user experiences the immersive virtual reality world. For example, the media player device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

As the user experiences the immersive virtual reality world, the virtual reality media system may detect that a gaze of the user (e.g., the attention of the user based on where the user is looking) is directed for a predetermined amount of time at a gaze target included within the field of view. For example, as will be described in more detail below, the virtual reality media system may detect or track the gaze of the user by using a gaze reticle persistently centered within the field of view, by tracking eye movements of the user (e.g., detecting and tracking an angle at which the retinas of the user's eyes are directed) to precisely determine which area of the field of view the user is viewing, by tracking movement of a controller associated with the media player device (e.g., a ring controller, a gun controller, etc.), by using raytracing techniques, or by using any other suitable technique that may serve a particular embodiment. In certain examples, the virtual reality media system may determine that the user's attention is focused on a particular portion of the field of view at which the gaze target is presented. Gaze targets may include any camera-captured or virtual objects or icons presented within the immersive virtual reality world that are configured to trigger an action when selected based on the gaze of the user. Examples of gaze targets and manners of detecting where the gaze of the user is directed will be further described and illustrated below.

In response to detecting that the gaze of the user is directed for the predetermined amount of time at the gaze target, the virtual reality media system may determine that the gaze target has been selected and may present an interactive user interface associated with the gaze target. In certain examples, the interactive user interface may be presented within the field of view together with the content of the immersive virtual reality world. Examples of interactive user interfaces associated with gaze targets will be further described and illustrated below.

Methods and systems for allowing a user to control virtual reality media content based on the gaze of the user may provide significant advantages to the user and may simplify virtual reality media content and media player devices used to experience the virtual reality media content. For example, the user may benefit by being able to easily and naturally navigate an immersive virtual reality world he or she is experiencing by simply looking at gaze targets and/or gaze-based interactive user interfaces to control the virtual reality experience. For a head-mounted media player device positioned such that a display screen of the media player device is located directly in front of the user's eyes, gaze-based control of the virtual reality media content may provide the user a completely hands-free experience and may allow the user to become even more immersed into the virtual reality world than if he or she has to interact with user input devices (e.g., buttons, mice, keyboards, etc.) that have no analog in the immersive virtual reality world. Even for a media player device that presents the field of view on a relatively static screen (e.g., a screen of a desktop or laptop computer) and that is controlled by using, for example, navigation keys on a keyboard, gaze-based control of the virtual reality media content may allow the user to become more immersed into the virtual reality world than if he or she has to switch between keyboard navigation keys to direct the field of view (i.e., to look around the immersive virtual reality world) and a mouse or other user input device to select (e.g., click on) interactive controls within the immersive virtual reality world. In any situation, gaze-based control of virtual reality media content may be significantly more convenient, intuitive, and natural-feeling for the user than non-gaze-based control.

Additionally, presentation of an interactive user interface within the field of view together with the content of the immersive virtual reality may further simplify and improve the experience of the user within the immersive virtual reality world. For example, while the presentation of an interactive user interface may inherently detract from the immersiveness of the virtual reality experience to some degree, the user may continue to feel highly immersed and involved in the virtual reality experience when the interactive user interface is presented together with the content of the immersive virtual reality world rather than being presented entirely in place of the content.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary embodiments of a 360-degree camera, a virtual reality media backend system, and one or more media player devices operate to facilitate gaze-based control of virtual reality media content. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media backend system 108 ("backend system 108") by way of a network 110. After preparing and/or processing the data representative of the 360-degree images to generate an immersive virtual reality world based on the 360-degree images, backend system 108 may transmit data representative of the immersive virtual reality world to one or more media player devices 112 such as a head-mounted virtual reality device 112-1, a personal computer device 112-2, a mobile device 112-3, and/or to any other form factor of media player device that may serve a particular implementation. Regardless of what form factor media player devices 112 take, users 114 (e.g., users 114-1 through 114-3) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. In certain examples, camera 102 may include one or more cameras for stereoscopic effect. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to backend system 108. Alternatively, camera 102 may be configured to transmit the raw image data directly to backend system 108, and any processing and/or combining of the raw image data may be performed within backend system 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated (e.g., animated) based on models of an imaginary world rather than captured from real-world scenery 104 by camera 102. As such, camera 102 may be omitted in certain examples.

Backend system 108 may be associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications) by way of media player devices 112. To this end, backend system 108 may receive, generate, process, and/or maintain data representative of virtual reality media content. For example, backend system 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), backend system 108 may unwrap, combine (i.e., stitch together), or otherwise process the raw image data to form the 360-degree image representative of real-world scenery 104.

Based on the camera-captured data representative of real-world scenery 104 (e.g., the 360-degree image), backend system 108 may generate and maintain an immersive virtual reality world (i.e., data representative of an immersive virtual reality world that may be experienced by a user). For example, backend system 108 may generate a three-dimensional ("3D") model of the immersive virtual reality world where virtual objects may be presented along with projections of real-world scenery 104 to a user experiencing the immersive virtual reality world. To generate the immersive virtual reality world, backend system 108 may perform video transcoding, slicing, orchestration, modeling, and/or any other processing that may serve a particular embodiment.

Subsequent to or concurrent with generating one or more immersive virtual reality worlds associated with one or more virtual reality media content instances (also referred to herein as "virtual reality media content programs"), backend system 108 may provide access to the virtual reality media content programs for users, such as subscribers of a virtual reality media content service operated by the virtual reality media content provider and/or users who download or otherwise acquire virtual reality mobile applications provided by the virtual reality media content provider. To this end, backend system 108 may present a field of view of the immersive virtual reality world to users by way of media player devices 112 in response to requests from media player devices 112 to access the virtual reality media content. For example, as will be described in more detail below, backend system 108 may present the field of view by transmitting data representative of content of the immersive virtual reality world (e.g., virtual objects within the immersive virtual reality world, images of real-world scenery 104, etc.) to media player devices 112, which may render the data to display the content on their screens. Examples of immersive virtual reality worlds, fields of view of immersive virtual reality worlds, and virtual objects presented along with projections of real-world scenery 104 within immersive virtual reality worlds will be described below.

Camera 102, backend system 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, wide area network, or any other suitable network. Data may flow between camera 102, backend system 108, and media player devices 112 by way of network 110 using any communication technologies, devices, media, and protocols as may serve a particular implementation. While only one network 110 is shown to interconnect camera 102, backend system 108, and media player devices 112 in FIG. 1, it will be recognized that these devices and systems may intercommunicate by way of multiple interconnected networks as may serve a particular implementation.

Media player devices 112 (i.e., head-mounted virtual reality device 112-1, personal computer device 112-2, and mobile device 112-3) may be used by users 114 (i.e., users 114-1 through 114-3) to access and experience virtual reality media content received from backend system 108. To this end, media player devices 112 may each include or be implemented by a device capable of presenting a field of view of an immersive virtual reality world and detecting user input from a user (e.g. one of users 114) to dynamically change the content within the field of view as the user experiences the immersive virtual reality world. For example, media player devices 112 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content. As will be described in more detail below, different types of media player devices 112 (e.g., head-mounted virtual reality devices, personal computer devices, mobile devices, etc.) may provide different types of virtual reality experiences having different levels of immersiveness for users 114.

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend system 108). In other examples, media player devices 112 may request and receive data streams representative of virtual reality media content programs that users 114 experience while media player devices 112 remain in active communication with backend system 108 by way of network 110.

To facilitate users 114 in experiencing virtual reality media content, each of media player devices 112 may include or be associated with at least one display screen upon which a field of view of an immersive virtual reality world may be presented. Media player devices 112 may also include software configured to receive, maintain, and/or process data representative of the immersive virtual reality world to present content of the immersive virtual reality world within the field of view on the display screens of the media player devices. For example, media player devices 112 may include dedicated, standalone software applications (e.g., mobile applications) configured to process and present data representative of immersive virtual reality worlds on the displays. In other examples, the software used to present the content of the immersive virtual reality worlds may include non-dedicated software such as standard web browser applications.

Figure 2:
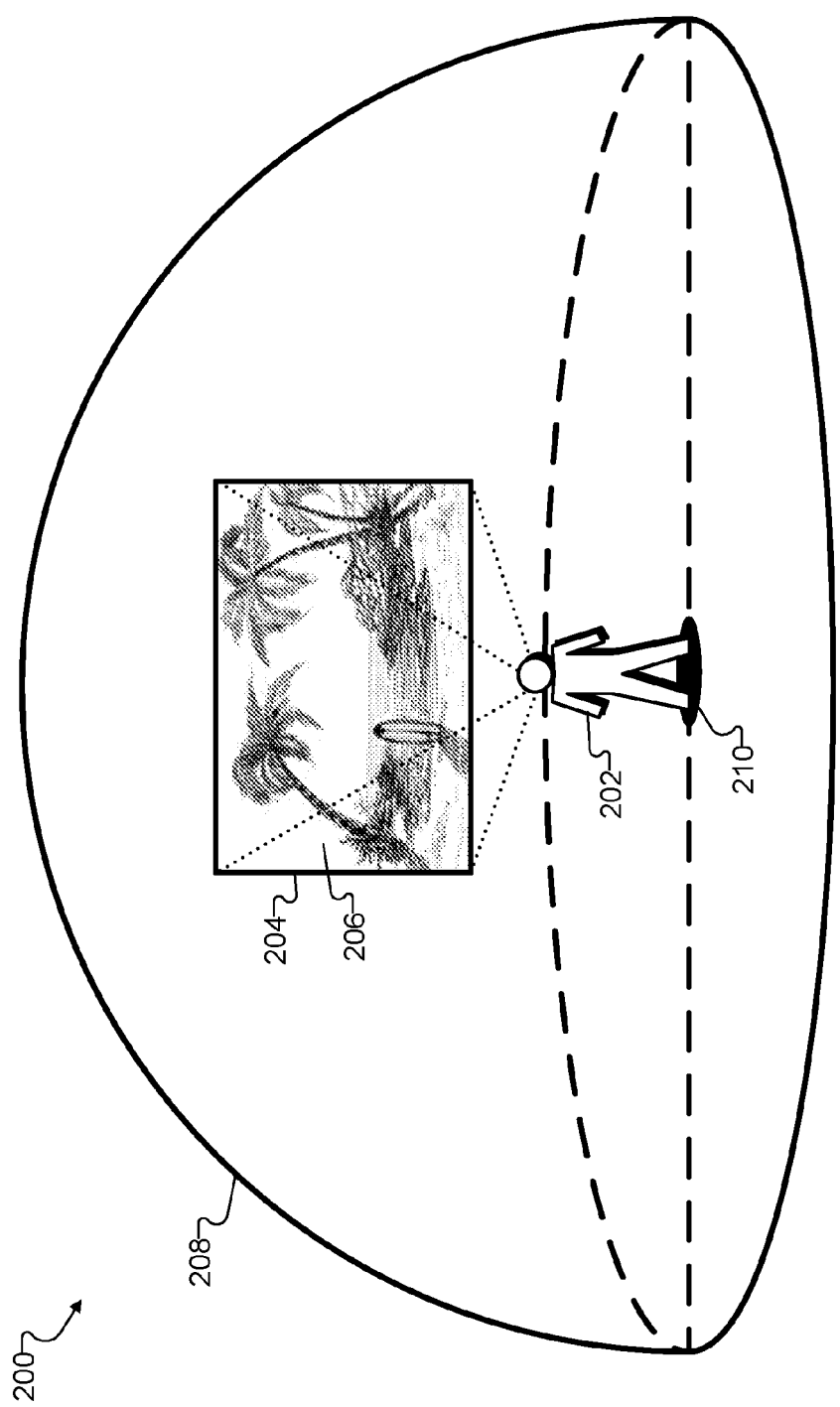
FIG. 2 illustrates an exemplary virtual reality experience in which a user is presented with an exemplary field of view that includes content of an exemplary immersive virtual reality world according to principles described herein.

FIG. 2 illustrates an exemplary virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For media player devices 112 such as personal computer 112-2 and/or mobile device 112-3, this user input may include a mouse movement, navigation key input from a keyboard, a swipe gesture, or the like. For media player devices 112 incorporating particular sensors (e.g., motion, directional, and/or orientation sensors) such as head-mounted virtual reality device 112-1 and/or mobile device 112-3, however, this user input may include a change to an orientation of the display screen of the media player device 112 with respect to at least one axis of at least two orthogonal axes. For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and the dynamic changing of the content includes gradually replacing content 206 to with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player device by which user 202 is experiencing world 208 (e.g., one of media player devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world content of world 208.

As shown in FIG. 2, world 208 may appear to surround a center point 210 associated with user 202. In some embodiments, center point 210 may be correspond to a location of a camera (e.g., camera 102) used to capture the content of world 208 (e.g., including content 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

Figure 3:
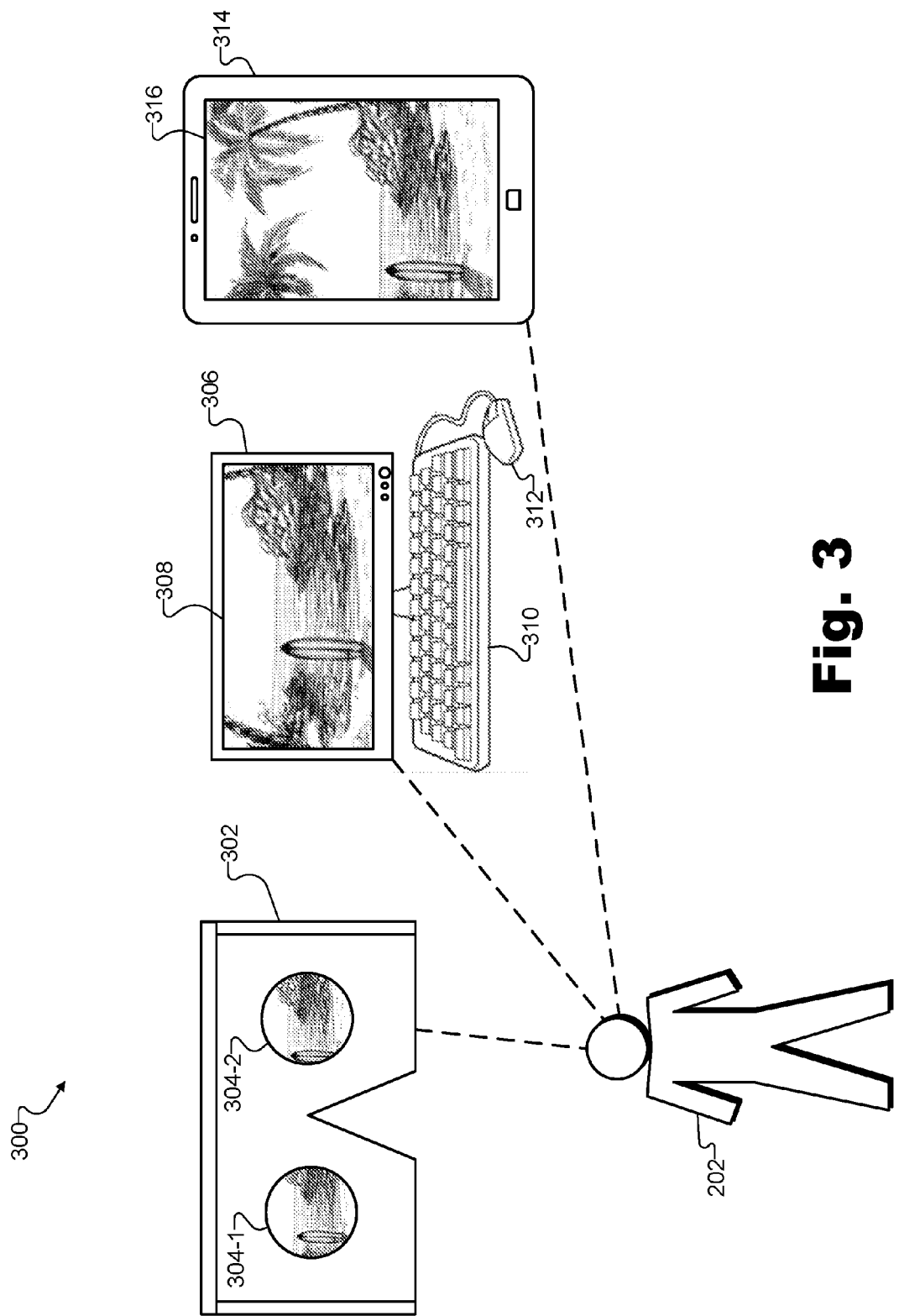
FIG. 3 illustrates exemplary media player devices configured to facilitate experiencing the exemplary immersive virtual reality world of FIG. 2 by a user according to principles described herein.

As mentioned above, different types of media player devices may provide different experiences for user 202 by presenting field of view 204 of world 208 in different ways, by receiving user input from user 202 in different ways, and so forth. To illustrate, FIG. 3 shows exemplary media player devices 300 configured to facilitate experiencing of world 208 by user 202. Media player devices 300 may correspond to media player devices 112, described above in relation to FIG. 1.

As one example, a head-mounted virtual reality device 302 may be mounted on the head of user 202 and arranged so that each of the eyes of user 202 sees a distinct display screen 304 (e.g., display screens 304-1 and 304-2) within head-mounted virtual reality device 302. In some examples, a single display screen 304 may be presented and shared by both eyes of user 202. In other examples, as shown, distinct display screens 304 within head-mounted virtual reality device 302 may be configured to display slightly different versions of field of view 204 (e.g., stereoscopic versions of field of view 204 that may be captured by one or more stereoscopic cameras) to give user 202 the sense that world 208 is three-dimensional. Display screens 304 may also be configured to display content 206 such that content 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, head-mounted virtual reality device 302 may provide user 202 with a natural and hands-free experience that does not require any physical console control to experience the immersive virtual reality world and that may be the most immersive virtual reality experience provided by any type of media player device.

As another example of a media player device, a personal computer device 306 having a display screen 308 (e.g., a monitor) may be used by user 202 to experience world 208. Because display screen 308 may not provide the distinct stereoscopic view for each of the user's eyes and/or may not fill the user's peripheral vision, personal computer device 306 may not provide the same degree of immersiveness that head-mounted virtual reality device 302 provides. However, personal computer device 306 may be associated with other advantages such as its ubiquity among casual virtual reality users that may not be inclined to purchase or use a head-mounted virtual reality device. In some examples, personal computer device 306 may allow a user to experience virtual reality content within a standard web browser so that user 202 may conveniently experience world 208 without using special devices or downloading special software. User 202 may provide user input to personal computer device 306 by way of a keyboard 310 (e.g., using navigation keys on keyboard 310 to move field of view 204) and/or by way of a mouse 312 (e.g., by moving mouse 312 to move field of view 204). In certain examples, a combination of keyboard 310 and mouse 312 may be used to provide user input such as by moving field of view 204 by way of navigation keys on keyboard 310 and clicking or otherwise interacting with objects within world 208 by way of mouse 312.

As yet another example of a media player device, a mobile device 314 having a display screen 316 may be used by user 202 to experience world 208. Mobile device 314 may incorporate certain advantages of both head-mounted virtual reality devices and personal computer devices to provide the most versatile type of media player device for experiencing world 208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by head-mounted virtual reality devices. For example, mobile device 314 may be configured to divide display screen 316 into two versions (e.g., stereoscopic versions) of field of view 204 and to present content 206 to fill the peripheral vision of user 202 when mobile device 314 is mounted to the head of user 202 using a relatively inexpensive and commercially-available mounting apparatus (e.g., a cardboard apparatus). In other embodiments, mobile device 314 may facilitate experiencing world 208 by receiving movement-based user input at arm's length (i.e., not mounted to the head of user 202 but acting as a hand-held dynamic window for looking around world 208), by receiving swipe gestures on a touchscreen, or by other techniques that may serve a particular embodiment.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

Figure 4:
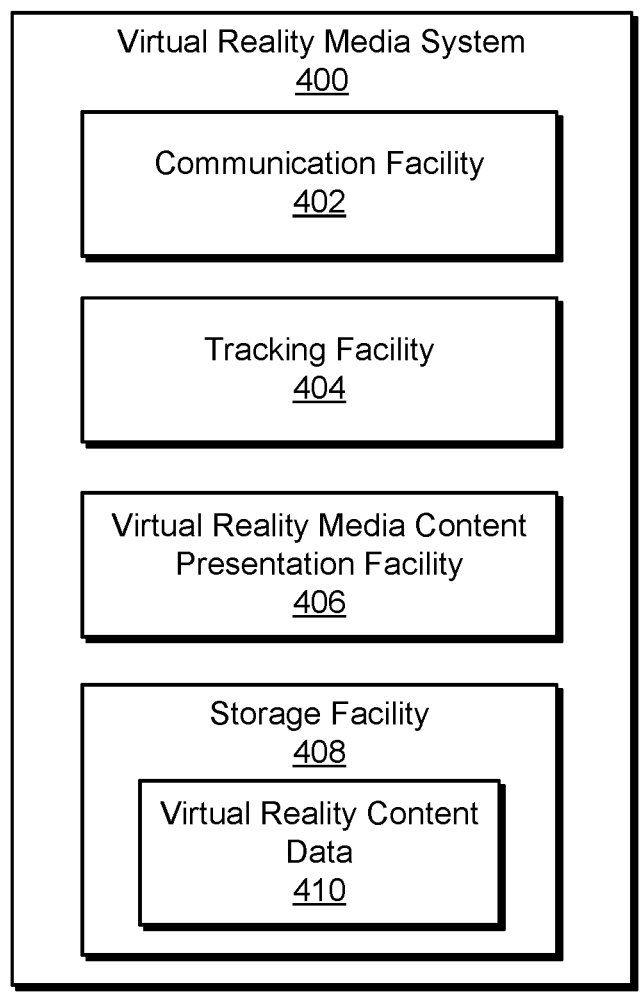
FIG. 4 illustrates an exemplary virtual reality media system configured to facilitate gaze-based control of virtual reality media content according to principles described herein.

FIG. 4 illustrates an exemplary virtual reality media system 400 ("system 400") configured to facilitate gaze-based control of virtual reality media content. As shown, system 400 may include, without limitation, a communication facility 402, a tracking facility 404, a virtual reality media content presentation facility 406, and a storage facility 408 selectively and communicatively coupled to one another. It will be recognized that although facilities 402-408 are shown to be separate facilities in FIG. 4, any of facilities 402-408 may be combined into fewer facilities, such as into a single facility, or divided into more facilities as may serve a particular implementation.

System 400 may be implemented by or may include one or more devices and/or systems of configuration 100, described above in relation to FIG. 1. For example, system 400 may be implemented entirely by backend system 108, entirely by one of media player devices 112, or by any combination of backend system 108 and a media player device 112 that may serve a particular implementation. In certain embodiments, camera 102, components of network 110, and/or one or more other computing devices (e.g., servers) remote from and communicatively coupled to media player devices 112 by way of network 110 may also serve to implement at least certain components and/or operations of system 400. As will be described in more detail below, system 400 may be used to present field of view 204 of world 208 (described above in relation to FIG. 2) within a display screen of a media player device (e.g., any of the media player devices described herein).

Storage facility 408 may maintain virtual reality content data 410 generated, received, transmitted, and/or used by communication facility 402, tracking facility 404, and/or virtual reality media content presentation facility 406. For example, virtual reality content data 410 may include data representative of content of world 208 (e.g., data representative of one or more 360-degree images that include content 206 shown in FIG. 2), data representative of one or more virtual objects that may be presented within world 208 (e.g., virtual objects associated with gaze targets), data representative of one or more gaze targets included within world 208, and/or data representative of one or more interactive user interfaces associated with the gaze targets included within world 208. Virtual reality content data 410 may further include data representative of an area of world 208 currently being presented within field of view 204, data used to track the location of field of view 204, data used to track the gaze of user 202, data used to render content to be presented within field of view 204, and/or any other data that may serve a particular implementation.

Communication facility 402 may perform any suitable communication operations for proper functionality of system 400. For example, as will be described in more detail below, communication facility 402 may receive or transmit data representative of world 208 to facilitate virtual reality media content presentation facility 406 in presenting field of view 204 and/or in presenting an interactive user interface within field of view 204. For example, in an embodiment where system 400 is entirely implemented by backend system 108, communication facility 402 may facilitate presenting field of view 204 and/or the interactive user interface by transmitting data representative of field of view 204 and/or the interactive user interface to one of media player devices 112. In this case, communication facility 402 may also facilitate tracking facility 404 in tracking the position of field of view 204 and/or the gaze of user 202 within world 208 by receiving tracking data from media player devices 112. Conversely, in an implementation where system 400 is entirely implemented by a media player device (e.g., one of media player devices 112 or 300), communication facility 402 may facilitate presenting field of view 204 and/or the interactive user interface by receiving data representative of field of view 204 and/or the interactive user interface from backend system 108.

Tracking facility 404 may perform any suitable tracking operations for proper functionality of system 400. For example, as will be described in more detail below, tracking facility 404 may receive user input (e.g., from user 202) representative of dynamic changes the user wishes to make to field of view 204 and may track a current position within world 208 of field of view 204 based on the user input. Tracking facility 404 may further track, based on the same user input and/or based on additional user input such as eye-tracking user input detected based on where the eyes of user 202 are looking (i.e., based on an angle in which the retinas of user 202 are directed), the gaze of user 202. In particular, tracking facility 404 may detect that a gaze of user 202 is directed for a predetermined amount of time at a gaze target included within field of view 204.

Virtual reality media content presentation facility 406 may perform any suitable image presentation and/or rendering operations for proper functionality of system 400. For example, as will be described in more detail below, virtual reality media content presentation facility 406 may present field of view 204 of world 208 on a display screen of one of media player devices 300 (e.g., display screens 304 of head-mounted virtual reality device 302, display screen 308 of personal computer device 306, or display screen 316 of mobile device 314). In presenting field of view 204, virtual reality media content presentation facility 406 may continuously and dynamically change (i.e., re-render and update) content presented within field of view 204 in response to user input provided by user 202 (e.g., as detected by tracking facility 404) while user 202 experiences world 208. Additionally, virtual reality media content presentation facility 406 may present, in response to a detection by tracking facility 404 that the gaze of user 202 is directed for the predetermined amount of time at the gaze target, an interactive user interface within field of view 204 together with content (e.g., content 206) of world 208. Examples of gaze targets and interactive user interfaces presented in response to user gaze being directed at the gaze targets for predetermined amounts of time will be described below.

A gaze target may refer to an object or location within an immersive virtual reality world configured to serve as a "hot spot" for gaze-based control. As used herein, gaze-based control refers to user control of a virtual reality media content experience that relies only on user focus and not on additional user input. For example, as will be described in more detail below, a user may perform gaze-based control of his or her virtual reality media content experience by providing user input to dynamically change a field of view of the immersive virtual reality world, by looking at a particular area within the field of view being presented, etc. Thus, in an example where a user is wearing a head-mounted virtual reality device or holding a mobile device, gaze-based control may be performed by changing the orientation of the display screen of the device (e.g., by the user turning his or her head or by moving/rotating the mobile device). Similarly, if the user is moving the field of view within the immersive virtual reality world using navigation keys of a keyboard of a personal computer device, gaze-based control may be performed by using the navigation keys to move the field of view. In either case, user input that includes non-gaze-based elements may not be considered gaze-based control. For example, in the example of the head-mounted virtual reality device, any manipulating of a mouse or trackpad or any pressing of a button or key on an external keypad may not be included within gaze-based control as used herein. Similarly, in the example of the field of view navigation using the navigation keys on the personal computer device, additional point-and-click input from a mouse or keystrokes not related to directing the field of view may also be excluded from gaze-based control as used herein.

Accordingly, gaze targets may facilitate gaze-based control by triggering particular operations when the gaze targets are detected to be gazed at (e.g., looked at or focused on by the user) for a particular amount of time. Gaze targets may take any form that may serve a particular implementation. For example, gaze targets may be stationary or may move within an immersive virtual reality world. Gaze targets may be real-world objects within the immersive virtual reality world (i.e., objects captured by a camera from the real-world scenery upon which the immersive virtual reality world is based), or virtual objects integrated into the immersive virtual reality world (i.e., objects that were not captured by a camera in the real-world scenery upon which the immersive virtual reality world is based but were generated and integrated into the world later). The objects may be two-dimensional ("2D") (e.g., a 2D icon object) or three-dimensional ("3D") (e.g., a 3D football scoreboard object).

In certain examples, gaze targets may be graphically highlighted to stand out from other content of the immersive virtual reality world surrounding the gaze targets. For example, real-world objects or virtual objects associated with gaze targets may be graphically highlighted with a glowing and/or bright-colored halo to indicate to the user that the objects are associated with gaze targets. In other examples, gaze targets may blend in with the content of the immersive virtual reality world or may even be completely invisible to the user. Gaze targets may be located in any location within the immersive virtual reality world that may serve a particular implementation. For example, gaze targets may be located in areas of interest (i.e., areas of the immersive virtual reality world where action is taking place) or areas that are unlikely to draw the interest of many users (e.g., where little action is taking place). In some examples, gaze targets may be located in an "off-screen" area of the immersive virtual world (e.g., directly below center point 210 in FIG. 2) that is not associated with camera-captured real-world scenery (e.g., an area that is outside of the camera-captured real-world scenery of the immersive virtual world).

In certain examples, gaze targets may be associated with a symbol (e.g., a graphical symbol, a color, etc.) indicative of the gaze target's function. For example, a gaze target may include a symbol to facilitate the user in performing gaze-based control to trigger desired operations while avoiding undesirable operations. In the examples described above, the symbol may be projected onto the real-world or virtual objects, while in other examples the symbol may be presented as a 2D icon directly superimposed over the content of the immersive virtual reality world. As will be described in more detail below, the symbol may be associated with a particular type of interactive user interface (e.g., an informational interface, a media control panel, a game, a navigation menu, etc.). Additionally or alternatively, the symbol may be associated with a well-known operation or company (e.g., social media sharing icons including, for example a TWITTER symbol, a FACEBOOK symbol, or the like).

Gaze targets may be designated and integrated into the immersive virtual reality world by a virtual reality media content provider (e.g., within backend system 108, described above in relation to FIG. 1). Additionally or alternatively, gaze targets may be designated by a content creator (e.g., an operator of camera 102) prior to the virtual reality media content provider receiving the content representative of the camera-captured real-world scenery from which the immersive virtual reality world may be generated.

To illustrate, FIG. 5 shows an exemplary field of view of an immersive virtual reality world that includes an exemplary gaze target. More particularly, user 202 is shown to be experiencing an immersive virtual reality world 500 ("world 500") that includes content 502 being presented within a field of view 504. As shown, world 500 may include content based on camera-captured real-world scenery depicting a football game. In the example of FIG. 5, user 202 may have entered user input to dynamically direct field of view 504 to include content 502 showing a goalpost on the football field in the camera-captured real-world scenery. Integrated with the camera-captured real-world scenery of the football game depicted by content 502, a gaze target 506 is also included within field of view 504. As shown, gaze target 506 is located in an area that typically involves little action during a football game (i.e., superimposed over the crowd far above the goalpost). As such, gaze target 506 may be unlikely to be gazed at (i.e., and thereby selected) unless user 202 intentionally intends to perform gaze-based control by using gaze target 506. As shown, gaze target 506 is associated with (i.e., implemented by) a 2D icon. The 2D icon may be recognizable by the user as being a gaze target that will trigger a media control panel interactive user interface to be presented.

As described above, system 400 may detect that a gaze of user 202 is directed for a predetermined amount of time at gaze target 506 while gaze target 506 is included within field of view 504. System 400 may perform this detection in any way that serves a particular implementation. For example, system 400 may track a gaze reticle persistently centered within field of view 504 with respect to at least one of a vertical dimension and a horizontal dimension of field of view 504. As used herein, a gaze reticle may be a particular area of field of view 504 (e.g., a small area in the horizontal and/or vertical center of field of view 504) where the gaze of user 202 normally resides. For example, while a user may view a larger portion of field of view 504 than just the gaze reticle in the center and/or may look at other portions of field of view 504 other than the gaze reticle by turning his or her eyes without moving field of view 504 (e.g., without turning his or her head), system 400 may be configured to assume that the user's gaze is generally focused at the gaze reticle in the center of field of view 504.

Based on the tracking of the gaze reticle, system 400 may determine that the gaze reticle is directed at gaze target 506 and may further determine that the gaze reticle remains persistently directed at gaze target 506 for the predetermined amount of time. Accordingly, based on the determination that the gaze reticle remains persistently directed at gaze target 506, system 400 may assume that the actual gaze of user 202 is similarly directed at gaze target 506 and, thus, that user 202 intends to trigger an operation associated with gaze target 506.

To illustrate, FIG. 6 shows field of view 504 of world 500 including gaze target 506 along with a gaze reticle 602. As shown, gaze reticle 602 is a small area centered horizontally within field of view 504 and slightly offset from being centered vertically within field of view 504 (i.e., positioned slightly above a vertical center of field of view 504). In certain examples, gaze reticle 602 may be centered vertically within field of view 504 and/or slightly offset from being centered horizontally as may serve a particular embodiment.

Gaze reticle 602 may be any size that may serve a particular implementation. For example, gaze reticle 602 may be very small, requiring a high degree of precision by user 202 to select a gaze target 602 so that gaze target 602 is less likely to be selected inadvertently. Conversely, gaze reticle 602 may be large (e.g., up to the size of the entire field of view 504) to require less precision from user 202. In some embodiments the size of gaze reticle 602 may change based on what content is included within field of view 504. For example, when field of view 504 includes content that is unlikely to be associated with gaze-based control (e.g., content in which action is occurring in world 500), gaze reticle 602 may be small, while when field of view 504 includes content that is more likely to be associated with gaze-based control (e.g., "off-screen" content or content with little action occurring), gaze reticle 602 may be larger.

Gaze reticle 602 may be visible or invisible to user 202 as user 202 experiences world 500. For example, in some cases, user 202 may find it convenient for system 400 to persistently display a cursor (e.g., a circular dot) positioned at a center of gaze reticle 602 or to display a box (e.g., similar to the dashed box indicative of gaze reticle 602 shown in FIG. 6) to indicate exactly where gaze reticle 602 is positioned relative to content of field of view 504. In other cases, however, user 202 may find a persistently-displayed gaze reticle to be inconvenient or annoying and, thus, system 400 may not display any indicator (e.g., cursor) associated with gaze reticle 602. In yet other implementations, a hybrid approach may be used where system 400 may not typically display an indicator associated with gaze reticle 602 unless gaze reticle 602 is within a predefined distance of a particular gaze target, at which point an indicator may be displayed to assist user 202 with selecting the particular gaze target if desired.

As illustrated within FIG. 6, gaze reticle 602 is currently positioned near the goalpost in content 502 below gaze target 506. Thus, in order to select gaze target 506, user 202 would need to provide user input to dynamically change the content displayed within field of view 504 so that gaze target 506 would be at least partially aligned with gaze reticle 602. For example, if user 202 is using a head-mounted virtual reality device, the user input may include a slight head movement by user 202 to look further up. If user 202 is using a personal computer device, the user input may include user 202 pressing an upward navigation key. If user 202 is using a mobile device in a mode where the motion and orientational sensors of the mobile device are not being used, the user input may include a slight downward swipe gesture. Once gaze reticle 602 is at least partially aligned with gaze target 506, system 400 may begin determining how long gaze reticle 602 is aligned with gaze target 506 to determine whether the gaze of user 202 is directed for the predetermined amount of time at gaze target 506.

As another example of detecting that the gaze of user 202 is directed for the predetermined amount of time at gaze target 506 while gaze target 506 is included within field of view 504, system 400 may track eye movements of user 202 as user 202 experiences world 500. Based on the eye movements of user 202, system 400 may determine that user 202 is looking at gaze target 506 and may further determine that user 202 continues to look at gaze target 506 for the predetermined amount of time. For example, system 400 may detect and track an angle at which the retinas of user 202 are directed at various points in time to precisely determine which area of field of view 504 user 202 is viewing at the various points in time.

To illustrate, an eye-tracking area 604 is shown in FIG. 6 to represent an area of field of view 504 in which user 202 is actually detected to be looking based on the eye tracking. Eye-tracking area 604 may dynamically change based on eye movements of user 202 (e.g., the angle at which the retinas of user 202 are directed) even when field of view 504 remains stationary. While in many examples eye-tracking area 604 may tend to be close to gaze reticle 602 in the center of field of view 504, eye-tracking area 604 may be located within any part of field of view 504 that user 202 may see. Like gaze reticle 602, an indicator (e.g., a cursor) associated with eye-tracking area 604 may be displayed visibly within field of view 504 or may be invisible as may serve a particular implementation.

As illustrated in FIG. 6, eye-tracking area 604 is currently aligned with gaze target 506. Thus, if system 400 supports eye-tracking as part of the gaze-based control, user 202 may select gaze target 506 by simply continuing to direct his or her eyes at gaze target 506 for at least the predetermined amount of time, even if he or she does not provide user input to dynamically change field of view 504 to direct field of view 504 upward toward gaze target 506.

Regardless of how the gaze of user 202 is tracked (e.g., by gaze reticle 602, by eye-tracking area 604, or by a combination of both or another suitable method), once system 400 determines that the gaze of user 202 is directed at gaze target 506, system 400 may detect whether the gaze remains directed at gaze target 506 for the predetermined amount of time (e.g., before the gaze moves, before gaze target 506 moves, etc.). In certain examples, gaze reticle 506 and/or eye-tracking area 604 may be invisible to user 202 as user 202 experiences world 500 through field of view 504 and the detection that the gaze of user 202 is directed for the predetermined amount of time at gaze target 506 may include system 400 displaying a graphical indicator indicating that gaze reticle 602 and/or eye-tracking area 604 is currently directed at gaze target 506 within field of view 504. The graphical indicator may be presented at a persistent location in field of view 504 associated with the gaze reticle. For example, the graphical indicator may be presented at the center of gaze reticle 602 or eye-tracking area 604. The graphical indicator my indicate, within field of view 504 concurrently with the determining by system 400 that gaze reticle 602 and/or eye-tracking area 604 remain persistently directed at gaze target 506 for the predetermined amount of time, a running time that has elapsed toward the predetermined amount of time.

Figure 7B:
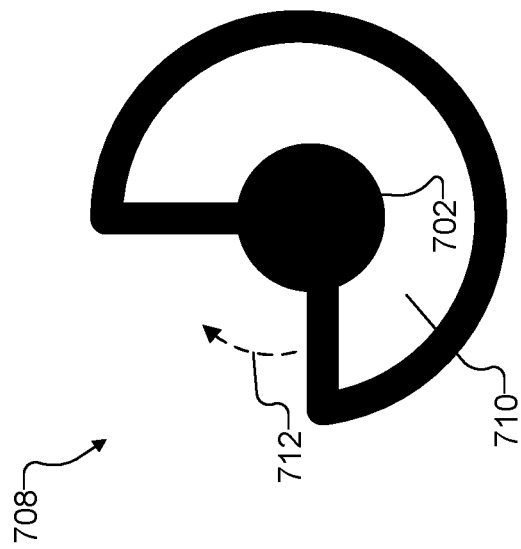
FIGS. 7A and 7B illustrate exemplary graphical indicators for indicating that a gaze of a user is directed at a gaze target according to principles described herein.
Figure 7A:
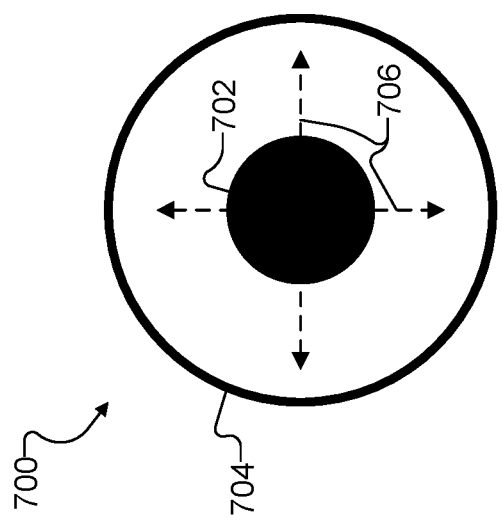

To illustrate, FIGS. 7A and 7B show exemplary graphical indicators for indicating that a gaze of user 202 is directed at gaze target 506. Specifically, as illustrated in FIG. 7A, a first exemplary graphical indicator 700 may include a cursor 702 surrounded by an outer circle 704. Cursor 702 may be the same or a similar cursor associated with gaze reticle 602 and/or eye-tracking area 604 in implementations that display such a cursor, as described above. When system 400 detects that the gaze of user 202 is directed at gaze target 506 (e.g., by determining that gaze reticle 602 and/or eye-tracking area 604 are aligned with gaze target 506), graphical indicator 700 may indicate a running time that has elapsed toward the predetermined amount of time by cursor 702 gradually growing during the predetermined amount of time until cursor 702 entirely fills outer circle 704, as illustrated by arrows 706. As such, if user 202 does not intend to select gaze target 506, user 202 may have at least the predetermined amount of time to direct his or her gaze away from gaze target 506 before gaze target 506 will be selected. To this end, the predetermined amount of time may be any length of time that may serve a particular embodiment. For example, the predetermined amount of time may be a few seconds (e.g., approximately two to four seconds) to give user 202 fair notice that he or she is in the process of selecting gaze target 506 before gaze target 506 is actually selected but without requiring user 202 to continue to gaze at gaze target 506 for an inordinate or inconvenient amount of time.

If system 400 detects that the gaze of user 202 continues to be directed at gaze target 506, cursor 702 may grow to entirely fill outer circle 704 after the predetermined amount of time has elapsed. At this point, user 202 will have successfully performed gaze-based control of the virtual reality media content by selecting gaze target 506. As a result, system 400 may perform an operation such as presenting an interactive user interface associated with gaze target 506. Examples of such interactive user interfaces will be described in more detail below.

FIG. 7B illustrates a second exemplary graphical indicator 708 that also includes cursor 702. As with graphical indicator 700, cursor 702 within graphical indicator 708 may be the same or a similar cursor associated with gaze reticle 602 and/or eye-tracking area 604 in implementations described above that display such a cursor. When system 400 detects that the gaze of user 202 is directed at gaze target 506 (e.g., by determining that gaze reticle 602 and/or eye-tracking area 604 are aligned with gaze target 506), graphical indicator 708 may indicate a running time that has elapsed toward the predetermined amount of time by gradually rotating a percentage indicator 710 around cursor 702 during the predetermined amount of time until percentage indicator 710 rotates all the way around cursor 702. As illustrated by arrow 712, percentage indicator 710 may rotate clockwise around cursor 702 to be suggestive of a hand rotating around a clock. However, in certain embodiments, percentage indicator 710 may also rotate counterclockwise around cursor 702.

If system 400 detects that the gaze of user 202 continues to be directed at gaze target 506, percentage indicator 710 may completely rotate around cursor 702 by the time that the predetermined amount of time has elapsed. At this point, user 202 will have successfully performed gaze-based control of the virtual reality media content by selecting gaze target 506. In response to the user selecting gaze target 506, system 400 may perform an operation such as presenting an interactive user interface associated with gaze target 506.

Interactive user interfaces presented as a result of gaze-based control (e.g., selection of gaze target 506) may include any user interface configured to present additional information to user 202 and/or to facilitate additional gaze-based control of the virtual reality media content (e.g., by facilitating the receiving of user input commands). For example, interactive user interfaces may include media control panels that include one or more gaze-selectable controls that may be selected to trigger system 400 to perform additional operations associated with the gaze-selectable controls. In the same or other examples, interactive user interfaces may include informational displays associated with the gaze targets that trigger them. In certain examples, interactive user interfaces may offer games, web-browsing, or other operations that may serve a particular embodiment. Additionally, while certain interactive user interfaces may replace the content (e.g., content 502) presented within field of view 504 to completely fill field of view 504, other interactive user interfaces may be configured to be presented within field of view 504 together with the content of world 500.

Figure 8:
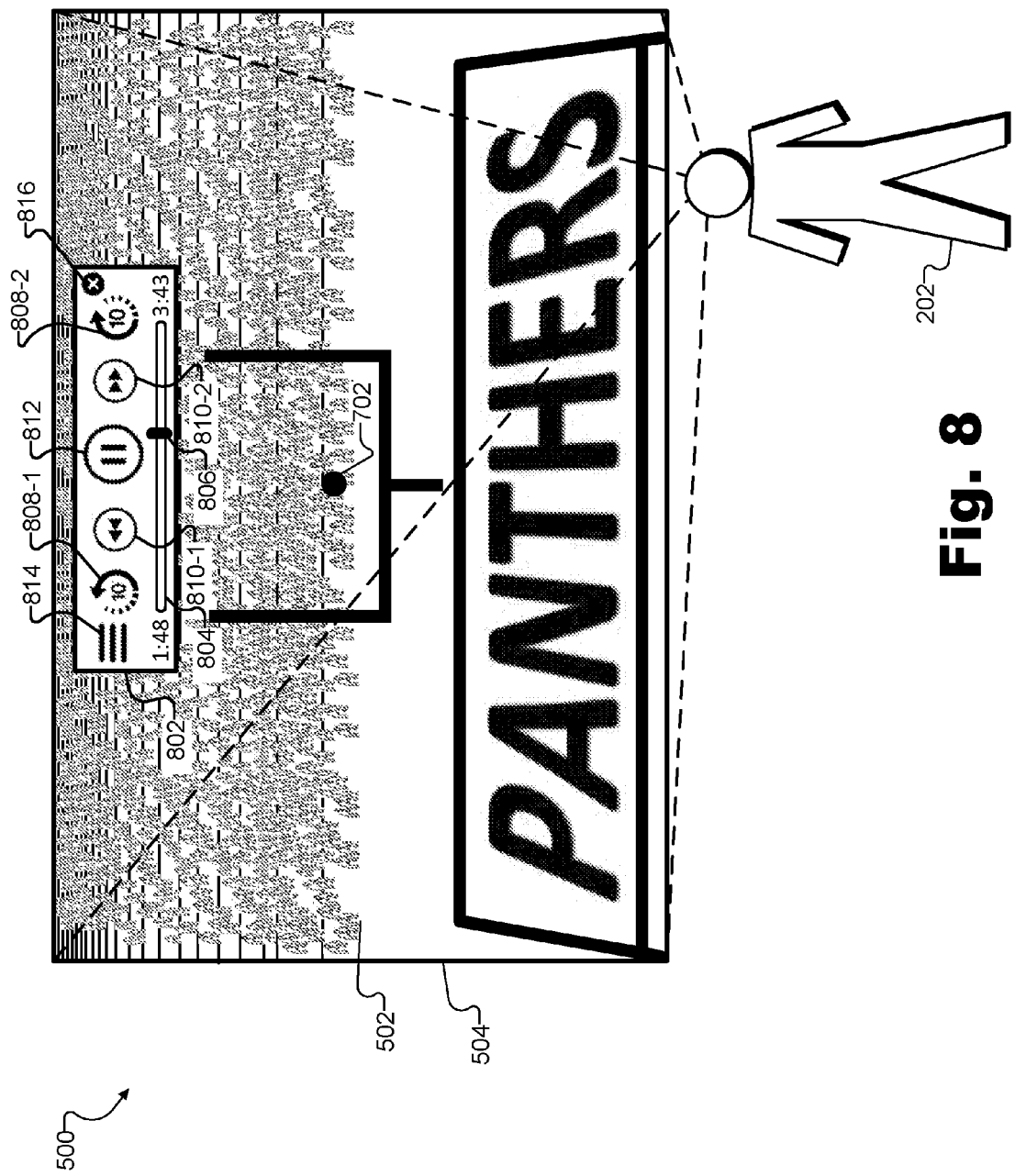
FIG. 8 illustrates an exemplary field of view of an immersive virtual reality world that includes an exemplary interactive user interface according to principles described herein.

To illustrate, FIG. 8 shows field of view 504 of world 500 that includes an exemplary interactive user interface 802 ("interface 802") being presented as a result of a gaze-based selection of gaze target 506 (described above in relation to FIGS. 5 and 6). As shown, interface 802 is presented for user 202 together with content 502 of world 500 (i.e., the camera-captured real-world scenery depicting the football game) within field of view 504. Specifically, interface 802 is displayed as being superimposed over content 502 in approximately the same location that the gaze target triggering interface 802 (i.e., gaze target 506) was located. In some implementations, interface 802 may be located in a stationary location within world 500 corresponding to the location of gaze target 506. In other implementations interface 802 may be configured to be persistently located within field of view 504 even if field of view 504 is dynamically changed to include different content of world 500.

As shown, interface 802 includes a media control panel displaying additional information not presented to user 202 within field of view 504 outside of interface 802, as well as a number of gaze selectable controls facilitating additional gaze-based control of the virtual reality media content associated with world 500. Specifically, world 500 may be associated with a virtual reality media program that includes a beginning and an end (e.g., a virtual reality sporting event like a football game, a virtual reality television show, a virtual reality movie, etc.). As such, the additional information presented to user 202 within interface 802 may include a period of time 804 over which the virtual reality media program may be presented to user 202 and a current playback point 806 of the virtual reality media program as the program progresses from the beginning of the program to the end of the program. Gaze-selectable controls may also be presented within the media control panel of interface 802, including discrete skip controls 808 (i.e., discrete skip controls 808-1 and 808-2), continuous skip controls 810 (i.e., continuous skip controls 810-1 and 810-2), a program playback control 812, a menu control 814, and a cancel control 816.

In response to presenting interface 802 within field of view 504, system 400 may provide further opportunities for gaze-based control by user 202 by detecting that the gaze of user 202 is directed at one of the gaze-selectable controls (e.g., one of gaze-selectable controls 808 through 816) for a second predetermined amount of time. The second predetermined amount of time may be similar or the same as the predetermined amount of time used for selecting gaze control 506 described above and may be chosen to satisfy similar considerations as those described above. Even if no cursor representative of gaze reticle 602 or eye-tracking area 604 was displayed prior to presenting interface 802, a cursor or other indication of gaze reticle 602 or eye-tracking area 604 may be persistently presented along with interface 802 to facilitate user 202 in selecting gaze-selectable controls 808 through 816 with precision. Additionally, as described in relation to FIGS. 7A and 7B above, system 400 may indicate a running time that has elapsed toward the second predetermined amount of time by displaying within field of view 504 a graphical indicator such as a graphical indicator 700 or graphical indicator 708. Then, based on a detection that the gaze of user 202 is directed at one of the gaze-selectable controls of interface 802 for the second predetermined amount of time, system 400 may perform an operation associated with the gaze-selectable control.

For example, system 400 may adjust current playback point 806 of the virtual reality media program as current playback point 806 progresses from the beginning of the virtual reality media program to the end of the virtual reality media program. Specifically, if system 400 detects that discrete skip control 808-1 is selected, system 400 may adjust current playback point 806 to skip backwards ten seconds in the virtual reality media program (e.g., so that a recent scene may be replayed). Similarly, if discrete skip control 808-2 is selected, system 400 may adjust current playback point 806 to skip forward ten seconds in the virtual reality media program (e.g., so that a portion of the virtual reality media program that user 202 does not want to experience may be skipped over). In a similar way, selecting continuous skip control 810-1 or 810-2 may, respectively, adjust current playback point 806 by skipping backward (e.g., rewinding) or forward (e.g., fast forwarding) in the virtual reality media program in a continuous fashion (e.g., continuing until an additional gaze-selectable control is selected by user 202). If program playback control 812 is selected, current playback point 806 may be adjusted by toggling program playback between playing back and pausing the virtual reality media content program.

In other examples, selecting gaze-selectable controls may trigger system 400 to perform operations associated with the gaze-selectable controls other than those that adjust current playback point 806. For example, selecting menu control 814 may trigger system 400 to display a menu such as an in-world menu displayed together with content 502 in field of view 504 that includes additional gaze-selectable options, or a standalone root menu that fills the entire field of view 504. Selecting cancel control 816 may trigger system 400 to cease displaying interface 802. Additional examples of gaze-selectable controls and operations that they trigger will be described below.

Figure 9:
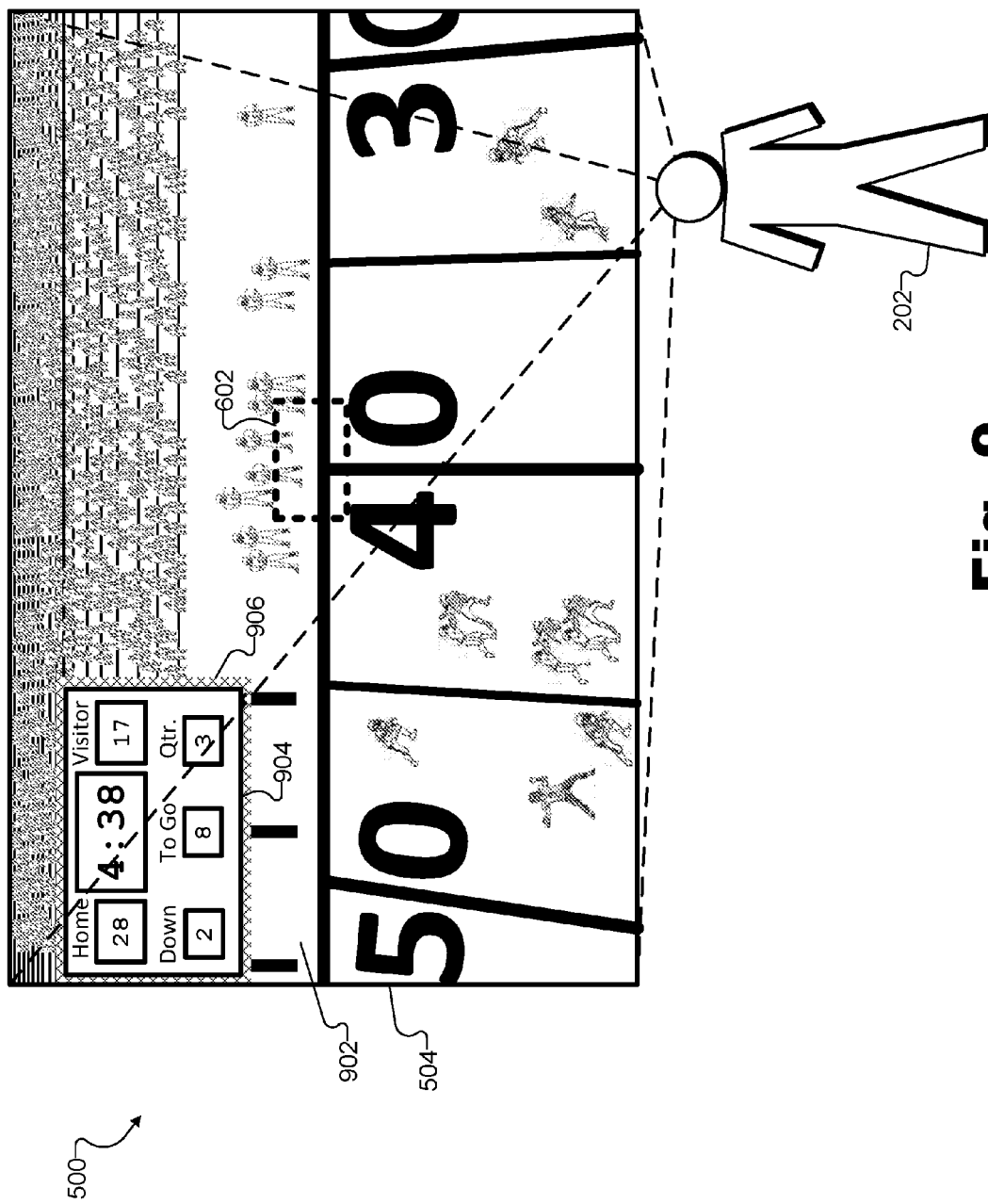
FIGS. 9 and 10 illustrate an exemplary field of view of an immersive virtual reality world that includes an exemplary gaze target according to principles described herein.
Figure 10:
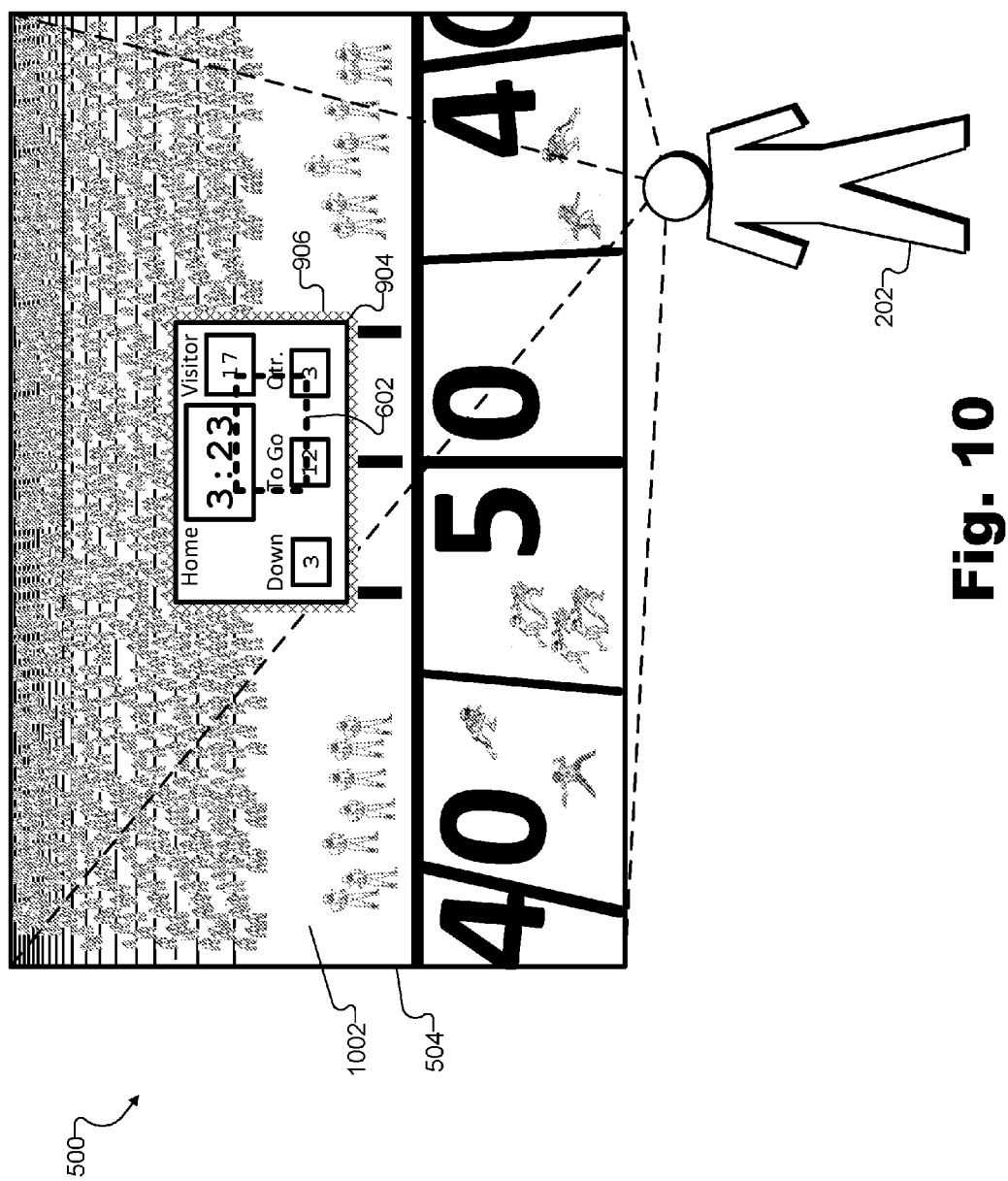

FIGS. 9 and 10 illustrate field of view 504 of world 500 that includes a different type of gaze target than gaze target 506 described above. Specifically, as shown in FIG. 9, integrated with content 902 of world 500 (e.g., camera-captured real-world scenery depicting a different portion of the football stadium during the football game), system 400 may present a gaze target 904 within field of view 504. In contrast to the icon associated with gaze target 506 described above, gaze target 904 may be associated with (e.g., implemented by) a scoreboard virtual object integrated into world 500. As shown, the scoreboard virtual object presents certain information related to the football game such as respective scores for each team, an amount of time left on the clock for the quarter, the current quarter of the game, and the current stance of the team playing offense (i.e., second down with eight yards to go). Additionally, as shown, gaze target 904 may be graphically highlighted by a halo 906 glowing around gaze target 904 to indicate to user 202 that it is a selectable gaze target.

While user 202 can see basic information relating to the football game with a cursory look at the scoreboard virtual object, user 202 may wish to access more in depth information not presented on the scoreboard. Accordingly, user 202 may direct his or her gaze to the highlighted scoreboard virtual object to select gaze target 904. For example, user 202 may provide user input to dynamically change content 902 within field of view 504 to align gaze reticle 602 with gaze target 904 for the predetermined amount of time as illustrated in FIG. 10. In FIG. 10, content 1002 has replaced content 902 within field of view 504 such that gaze target 904 is aligned with gaze reticle 602. By maintaining his or her gaze on gaze target 904 for the predetermined amount of time, user 202 may cause an interactive user interface to be presented that includes information associated with gaze target 904 that is associated with the scoreboard virtual object and that is not presented to user 202 within field of view 504 outside of the interactive user interface. For example, system 400 may present an interactive user interface that, like the virtual scoreboard object of gaze target 904, includes information related to the status of the football game and/or to statistics of the players and teams participating in the game.

Figure 11:
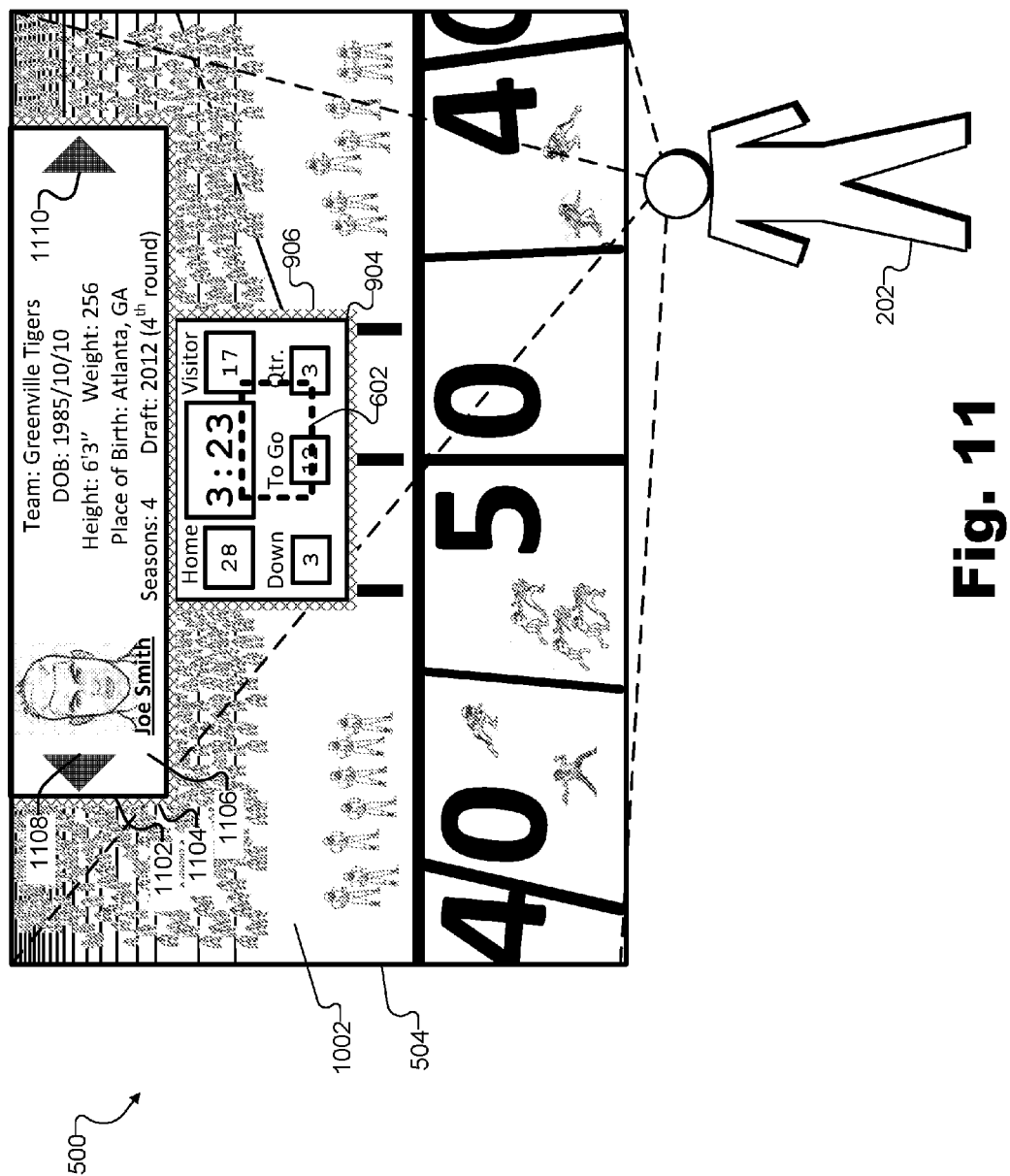
FIG. 11 illustrates an exemplary field of view of an immersive virtual reality world that includes an exemplary interactive user interface according to principles described herein.

To illustrate, FIG. 11 shows field of view 504 of world 500 that includes an exemplary interactive user interface 1102 ("interface 1102") graphically highlighted by a halo 1104 to stand out from content 1002 of world 500 surrounding interface 1102 and displaying additional information associated with the scoreboard virtual object (i.e., associated with the status and statistics of the football game, players, and teams) but not presented on the scoreboard virtual object (e.g., for lack of space). While interface 1102 displays additional information not displayed anywhere else within field of view 504 other than on interface 1102, it is noted that, in certain embodiments, interface 1102 may display a version (e.g., a magnified version that is easier for user 202 to see) of the same information presented on the gaze target or elsewhere within field of view 504.

As shown in FIG. 11, interface 1102 may include information 1106 about a particular player in the game (i.e., "Joe Smith"). For example, information 1106 may include a picture of the player and various statistics such as a team that the player is associated with, a date and place of birth for the player, physical statistics (e.g., height, weight, etc.) of the player, and career statistics (e.g., number of seasons played, year and round pick drafted, etc.) for the player. Interface 1102 may further include gaze-selectable controls 1108 and 1110, which may be selectable by the user to switch between players (e.g., to see similar information about other players) and/or to present statistics related to the selected player for the current or past games or information related to other aspects of the football game (e.g., information about the teams, coaches, stadium, city in which the game is being held, etc.).

As described above in relation to interface 802, interface 1102 may be located in any suitable location within world 500 and may remain stationary or may move within world 500 together with field of view 504. Additionally, in order to minimize how much interface 1102 detracts from the immersiveness of the virtual reality experience, interface 1102 may be semi-transparent and superimposed over content 1002 of world 500 such that content 1002 of world 500 behind interface 1102 may be at least partially viewed by the user (not explicitly shown).

Figure 12:
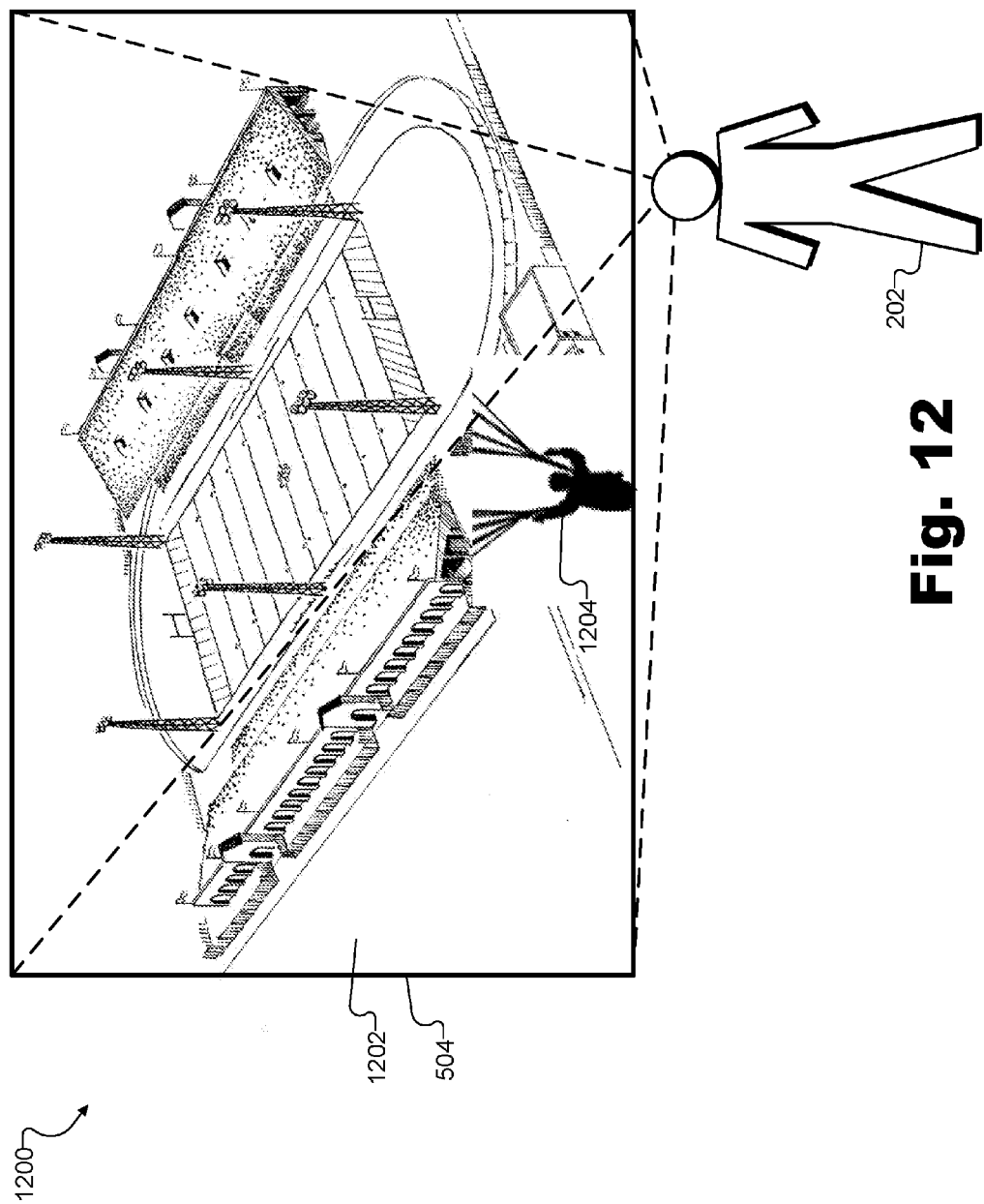
FIG. 12 illustrates an exemplary field of view of an immersive virtual reality world that includes an interactive user interface comprising an interactive game according to principles described herein.

In some examples, an interactive user interface such as interface 802 or interface 1102 may further include a gaze-selectable control associated with another type of operation besides informational and navigational operations discussed thus far. Indeed, systems and methods for gaze-based control of virtual reality media content described herein may be employed on any type of interactive user interface that may serve a particular embodiment. As one additional example, FIG. 12 shows field of view 504 of an immersive virtual reality world 1200 ("world 1200") that includes an interactive user interface 1202 ("interface 1202") comprising an interactive game. As shown, the game of interface 1202 may be associated with the football field shown in the content of world 500 in previous figures. However, rather than being based on camera-captured real-world scenery, the game may take place in a purely virtual world. For example, user 202 may select a gaze target or a gaze-selectable control within an interactive user interface to bring up interface 1202, which may allow user 202 to play a game to pass time (e.g., during half-time of the football game and/or while waiting for the football game to begin).

Gaze-based control of interface 1202 may operate using gaze-selectable controls similar to those described above, or by other interactive, gaze-based control methods. For example, the game associated with interface 1202 may be controlled exclusively by one or more gaze-based gestures. As shown, a character 1204 may appear to be on a conveyance that is navigable in the air (e.g., a paraglider, an airplane, a griffin, etc.) or on the ground (e.g., a race car, a bus, etc.) by gaze-based gestures such as leaning to the left to turn left, leaning to the right to turn right, looking down to dive or move forward, looking up to climb or reverse direction, and/or any other gaze-based gestures that may serve a particular game. In some examples, no character and/or no conveyance may be shown.

As shown in FIG. 12, the game of interface 1202 may be presented across the entirety of field of view 504 such that world 1200 effectively replaces world 500. In other examples, however, system 400 may present world 1200 within interface 1202 together with content from world 500. For example, a top portion of field of view 504 may be dedicated to world 500 so that user 202 can continue experiencing world 500 and any virtual reality media content program associated with world 500 while simultaneously playing a game within world 1200, which may be presented within interface 1202 on a bottom portion of field of view 504.

Figure 13:
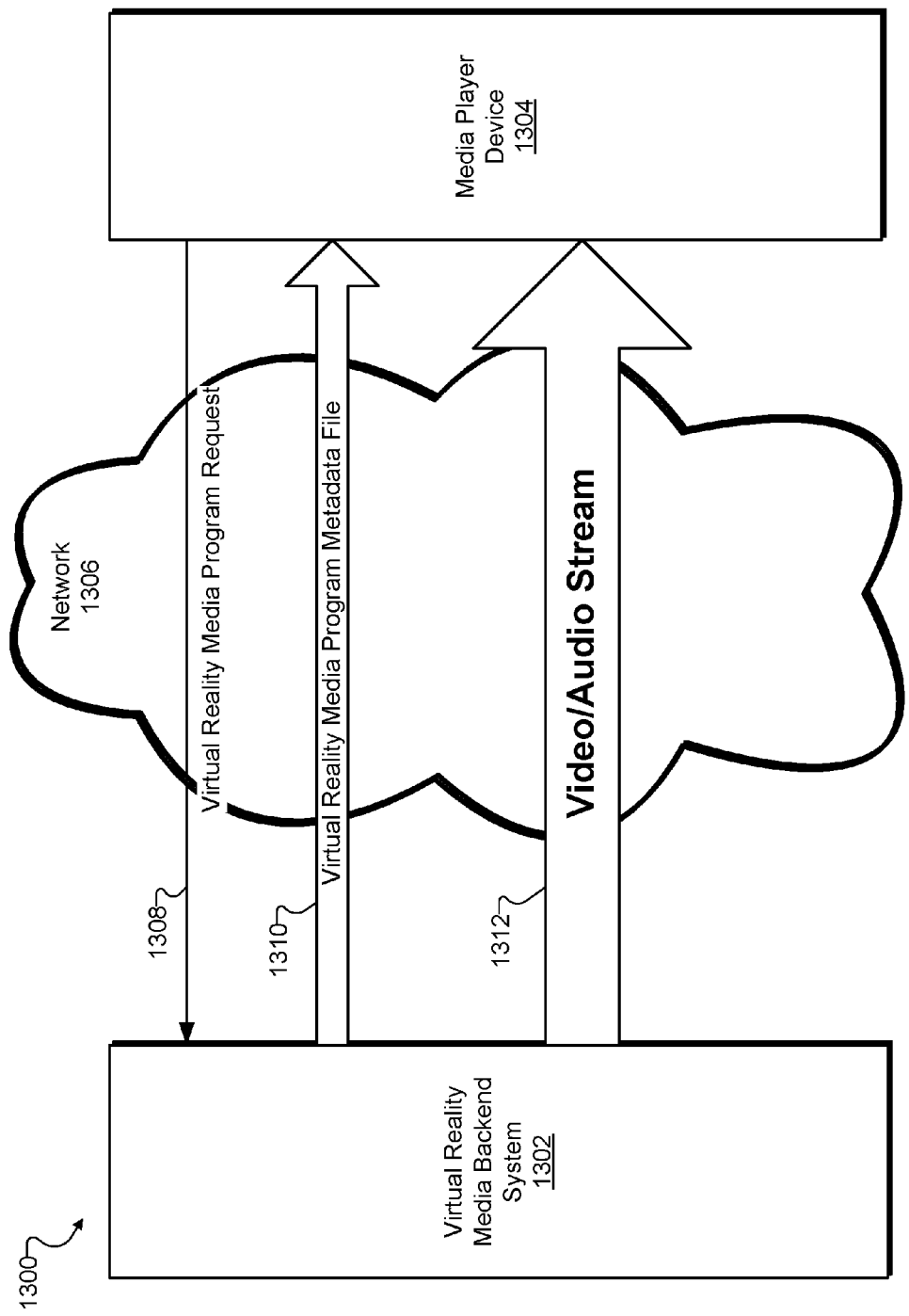
FIG. 13 illustrates an exemplary configuration in which an exemplary virtual reality media backend system and an exemplary media player device operate to insert a gaze target into an immersive virtual reality world according to principles described herein.

FIG. 13 illustrates an exemplary configuration 1300 in which an exemplary virtual reality media backend system 1302 ("backend system 1302") and an exemplary media player device 1304 operate to insert a gaze target into an immersive virtual reality world. Backend system 1302 and media player device 1304 may be the same or similar to other systems and/or devices described herein, and, as such, may each be implemented by an end-user device, by a server device that streams media content to an end-user device, or distributed across an end-user device and a server device. For example, backend system 1302 may be the same or similar to backend system 108, and media player device 1304 may be the same or similar to any of media player devices 112 or 300. Additionally, backend system 1302 and/or media player device 1304 may implement, individually or together in combination, some or all of the functionality of system 400 described above.

As shown, backend system 1302 and media player device 1304 may be communicatively coupled via a network 1306, which may use various network components and protocols to facilitate communication between backend system 1302 and media player device 1304 in the same or a similar fashion as described above in relation to network 110. In particular, as will be described below, network 1306 may carry data representative of a virtual reality media program request 1308 ("request 1308"), a virtual reality media program metadata file 1310 ("metadata file 1310"), a video/audio stream 1312, and any other data that may be transferred between backend system 1302 and media player device 1304.

As illustrated by configuration 1300, in operation, media player device 1304 may transmit request 1308 to backend system 1302 over network 1306. For example, media player device 1304 may transmit request 1308 (e.g., a Hypertext Transfer Protocol ("HTTP") call) based on user input from a user of media player device 1304. Specifically, media player device 1304 may provide the user one or more options to request access to virtual reality media content such as by providing a selection of links (e.g., HTTP links) to a variety of virtual reality media content (e.g., different immersive virtual reality worlds). In response to user input to access the virtual reality media content of a particular immersive virtual reality world (e.g., a user selection of a particular link from the selection of links), media player device 1304 may transmit request 1308 to backend system 1302. Request 1308 may include a command (e.g., associated with an HTTP call) that causes backend system 1302 to transmit data representative of metadata file 1310 and/or video/audio stream 1312 to media player device 1304 by way of network 1306.

As one example, request 1308 may include a command that causes backend system 1302 to transmit data representative of metadata file 1310 to media player device 1304, and metadata file 1310 may include data representative of one or more additional commands that cause media player device 1304 to perform other operations including requesting, receiving, and/or presenting video/audio stream 1312. For example, metadata file 1310 may include metadata related to one or more gaze targets (e.g., image data for the gaze targets, display parameters for the gaze targets, etc.) that may be presented within the immersive virtual reality world selected by the user. Video/audio stream 1312 may include data representative of content of the immersive virtual reality world other than gaze targets, virtual objects, commercial advertisements, and/or other content inserted into the world based on data included within metadata file 1310. For example, video/audio stream 1312 may include video and/or audio data related to real-world scenery content (e.g., a 360-degree image captured by a camera such as camera 102) of the immersive virtual reality world.

Media player device 1304 may receive, analyze, and/or otherwise use video/audio stream 1312 to present the immersive virtual reality world within a field of view for the user. In certain examples, gaze targets may be inserted into the immersive virtual reality world at static locations at which users may expect to find the gaze targets, and where the gaze targets may not be overly intrusive or distracting to the overall virtual reality experience of the user. For example, gaze targets may be located on or near the ground (i.e., below a typical line of sight for most users) so that users can simply look down to find a gaze target which may be used to, for example, bring up a media control panel to allow the user to navigate within a virtual reality media program. In such examples, user interfaces triggered by the gaze targets (e.g., a media control panel user interface, etc.) may be statically programmed into software on media player device 1304 or otherwise accessed by media player device 1304 (e.g., from a separate server of database other than backend system 1302) such that the user interfaces do not utilize specific metadata such as may be included within metadata file 1310.

Figure 14:
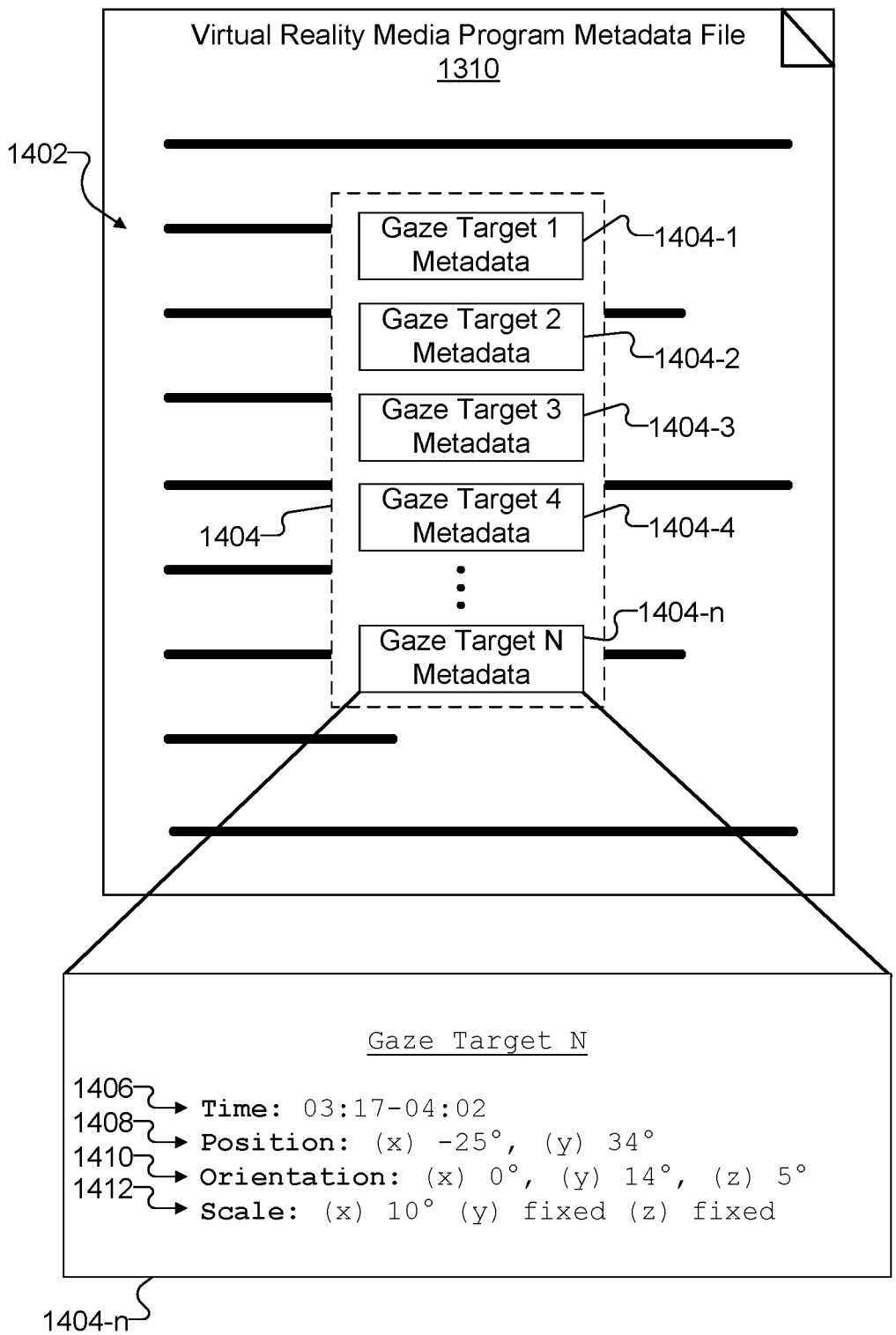
FIG. 14 illustrates an exemplary virtual reality media program metadata file according to principles described herein.

In other examples, metadata file 1310 may include metadata related to gaze targets that are dynamic and/or particular to the immersive virtual reality world, and that may be inserted at particular times and with particular display parameters into the immersive virtual reality world. To illustrate, FIG. 14 shows additional details for metadata file 1310 described above in relation to FIG. 13. As shown, metadata file 1310 may include data 1402 (e.g., textual data, metadata tags, markup code or other instructions, etc.) that may include metadata related to one or more gaze targets that have been or are to be inserted in the immersive virtual reality world. For example, as shown, metadata file 1310 may include data 1402 representative of gaze target metadata 1404 (e.g., gaze target metadata 1404-1 through gaze target metadata 1404-*n*). For example, gaze target metadata 1404 may include data describing display parameters for a plurality of gaze targets (e.g., Gaze Target 1 through Gaze Target N). Along with gaze target metadata 1404, data 1402 may also include any other data (e.g., initialization data, gaze target image data, metadata, advertising data, user interface data, etc.) that backend system 1302 may transmit to media player device 1304 as may suit a particular implementation.

FIG. 14 further illustrates exemplary metadata that may be included within gaze target metadata 1404 (i.e., for the nth gaze target ("Gaze Target N") associated with gaze target metadata 1404-*n*). Specifically, as shown, gaze target metadata 1404-*n* may include a time parameter 1406 that may indicate a time at which Gaze Target N may be displayed within the immersive virtual reality world. For example, time parameter 1406 indicates that Gaze Target N may be displayed within the immersive virtual reality world beginning 3 minutes and 17 seconds into the presentation of the immersive virtual reality world and ending 4 minutes and 2 seconds into the presentation of the immersive virtual reality world.

Gaze target metadata 1404-*n* may further include display parameters related to Gaze Target N such as a positional parameter 1408, an orientation parameter 1410, and a scale parameter 1412. As shown, positional parameter 1408 may include x and y components indicative of a position within the immersive virtual reality world at which Gaze Target N is located. As shown, positional parameter 1408 may be expressed in degrees in relation to axes of the immersive virtual reality world. While only x and y components are illustrated, it will be understood that fewer or additional components (e.g., including a z component) may be used to describe the position of Gaze Target N in particular implementations. Orientation parameter 1410 may include x, y, and z components indicative of a spatial orientation (i.e., a tilt or an angle) with which Gaze Target N is presented within the immersive virtual reality world. Orientation parameter 1410 may also expressed in degrees in relation to axes of the immersive virtual reality world. Fewer or additional components may be used to describe the orientation of Gaze Target N in particular implementations. Scale parameter 1412 may include x, y, and z components (e.g., if Gaze Target N is a 3D object) indicative of a scale (i.e., an apparent size) with which Gaze Target N is presented within the immersive virtual reality world. In some examples, as shown, one component (e.g., the x component) may be configurable while other components (e.g., the y component and the z component) may be fixed based on the configurable component such that the relative proportions of Gaze Target N may remain constant. In other examples, each of the x, y, and z components of scale parameter 1412 may be independently configurable. Additionally, fewer or additional components may be used to describe the scale of Gaze Target N in particular implementations.

Media player device 1304 may receive metadata file 1310 in response to request 1308 and may use metadata file 1310 to present a user-selected immersive virtual reality world for experiencing by a user. Media player device 1304 may use the data included in metadata file 1310 in any suitable way to present the immersive virtual reality world. For example, media player device 1304 may use gaze target metadata to determine one or more operations to perform to access and present a gaze target within the immersive virtual reality world. For instance, media player device 1304 may use gaze target metadata to determine time and display parameters for the gaze target, access image data associated with the gaze target and/or with a user interface that may be triggered by the gaze target, present the gaze target within the immersive virtual reality world, and present the user interface that may be triggered by the gaze target when the user directs his or her gaze at the gaze target for a sufficient amount of time.

Figure 15:
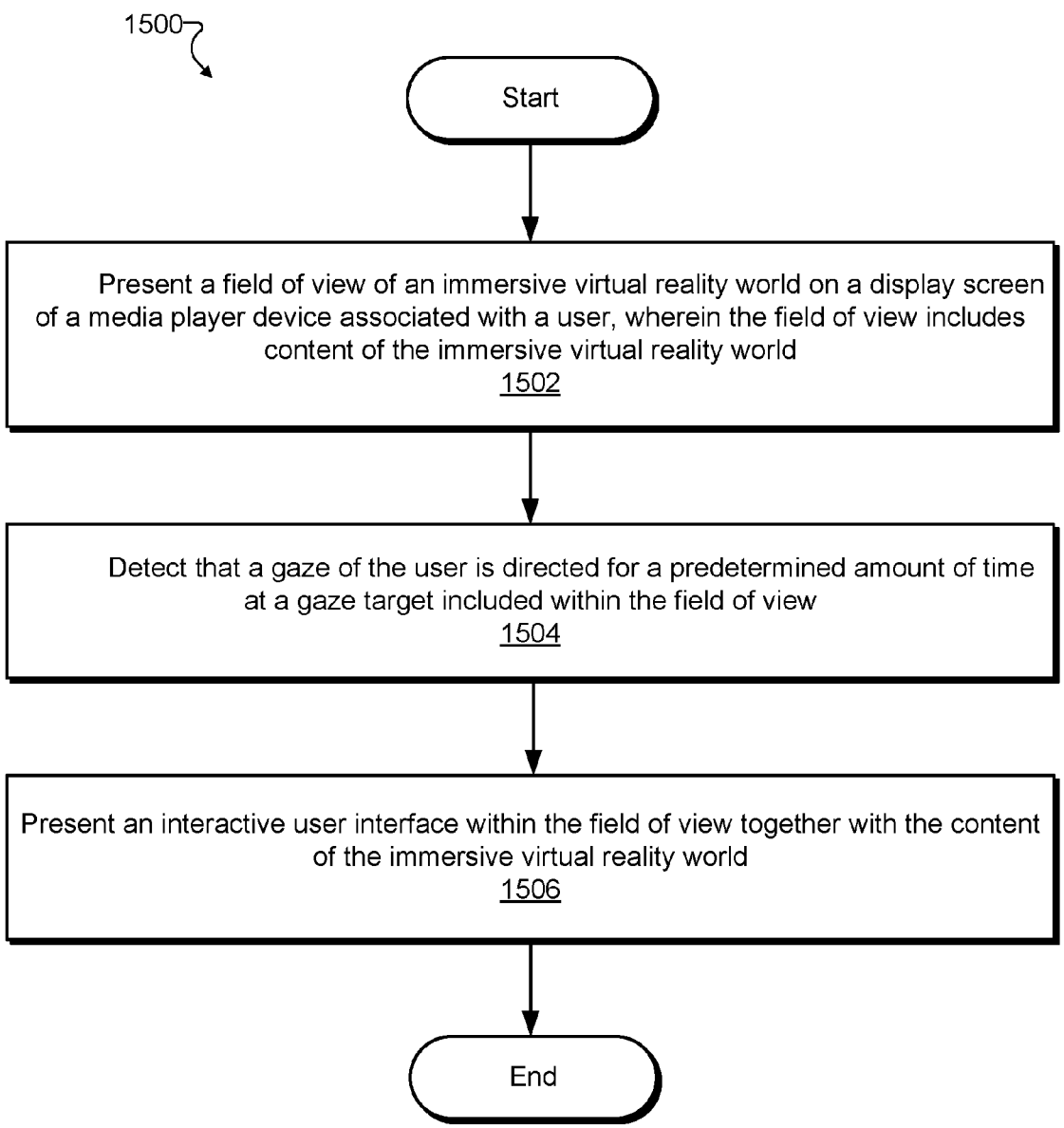
FIGS. 15 and 16 illustrate exemplary methods for gaze-based control of virtual reality media content according to principles described herein.

FIG. 15 illustrates an exemplary method 1500 of performing gaze-based control of virtual reality media content. While FIG. 15 illustrates exemplary operations according to one embodiment, other embodiments may omit, add to, reorder, and/or modify any of the operations shown in FIG. 15. One or more of the operations shown in FIG. 15 may be performed by system 400 and/or any implementation thereof.

In operation 1502, a virtual reality media system may present a field of view of an immersive virtual reality world on a display screen of a media player device associated with a user. In some examples, the field of view may include content of the immersive virtual reality world and may dynamically change in response to user input provided by the user as the user experiences the immersive virtual reality world. Operation 1502 may be performed in any of the ways described herein.

In operation 1504, the virtual reality media system may detect that a gaze of the user is directed for a predetermined amount of time at a gaze target included within the field of view. Operation 1504 may be performed in any of the ways described herein.

In operation 1506, the virtual reality media system may present an interactive user interface associated with the gaze target. For example, operation 1506 may be performed in response to the detecting, in operation 1504, that the gaze of the user is directed for the predetermined amount of time at the gaze target. In certain examples, the interactive user interface may be presented within the field of view together with the content of the immersive virtual reality world. Operation 1506 may be performed in any of the ways described herein.

Figure 16:
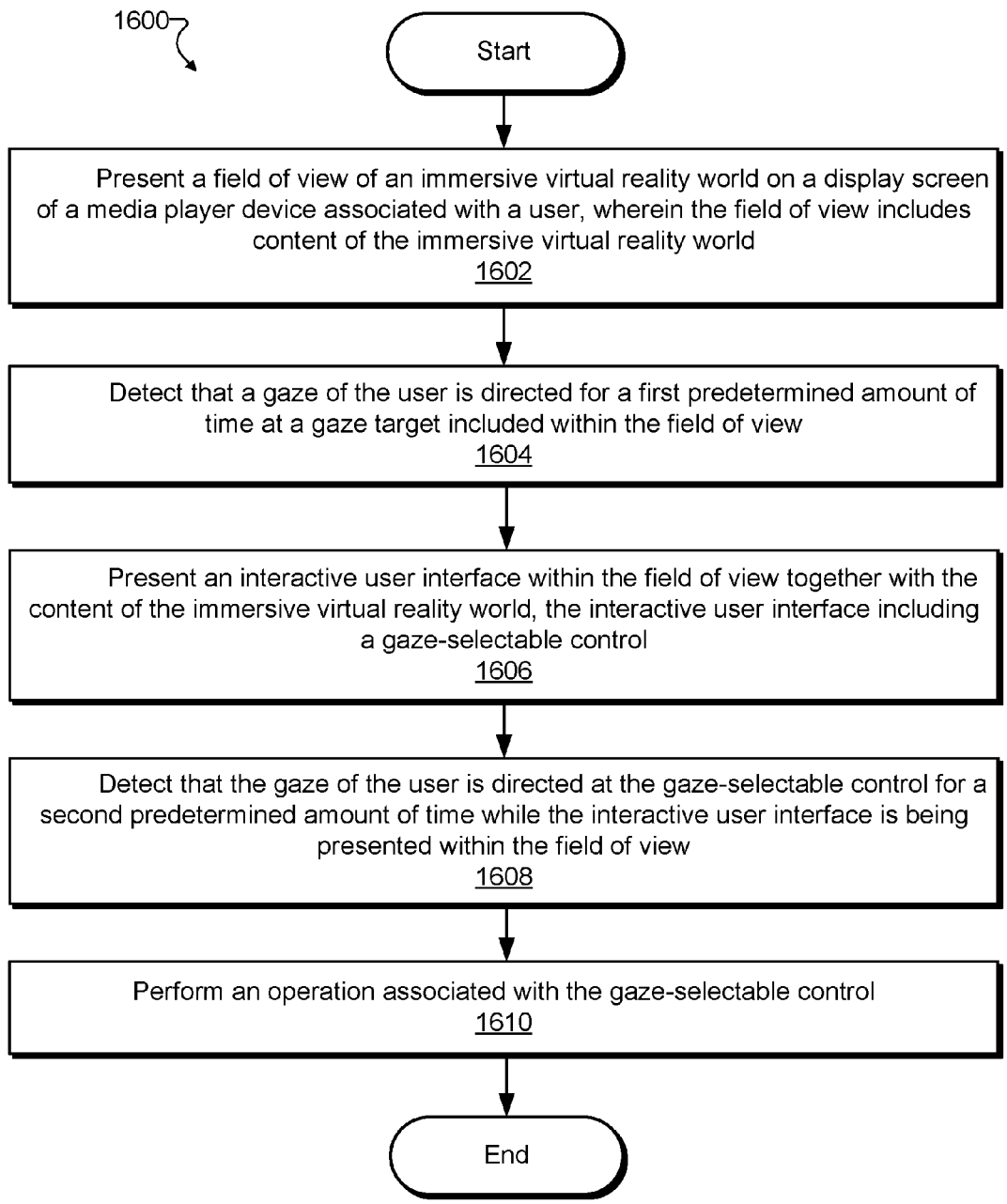

FIG. 16 illustrates an exemplary method 1600 of performing gaze-based control of virtual reality media content. While FIG. 16 illustrates exemplary operations according to one embodiment, other embodiments may omit, add to, reorder, and/or modify any of the operations shown in FIG. 16. One or more of the operations shown in FIG. 16 may be performed by system 400 and/or any implementation thereof.

In operation 1602, a virtual reality media system may present a field of view of an immersive virtual reality world on a display screen of a media player device associated with a user. In some examples, the field of view may include content of the immersive virtual reality world and may dynamically change in response to user input provided by the user as the user experiences the immersive virtual reality world. Operation 1602 may be performed in any of the ways described herein.

In operation 1604, the virtual reality media system may detect that a gaze of the user is directed for a first predetermined amount of time at a gaze target included within the field of view. Operation 1604 may be performed in any of the ways described herein.

In operation 1606, the virtual reality media system may present an interactive user interface associated with the gaze target. For example, operation 1606 may be performed in response to the detecting, in operation 1604, that the gaze of the user is directed for the first predetermined amount of time at the gaze target. In certain examples, the interactive user interface may be presented within the field of view together with the content of the immersive virtual reality world and may include a gaze-selectable control. Operation 1606 may be performed in any of the ways described herein.

In operation 1608, the virtual reality media system may detect that the gaze of the user is directed at the gaze-selectable control for a second predetermined amount of time. In some examples, the detecting that the gaze of the user is directed at the gaze-selectable control may be performed while the interactive user interface is being presented within the field of view. Operation 1608 may be performed in any of the ways described herein.

In operation 1610, the virtual reality media system may perform an operation associated with the gaze-selectable control. In some examples, the performing of the operation associated with the gaze-selectable control may be based on the detecting that the gaze of the user is directed at the gaze-selectable control for the second predetermined amount of time. Operation 1610 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
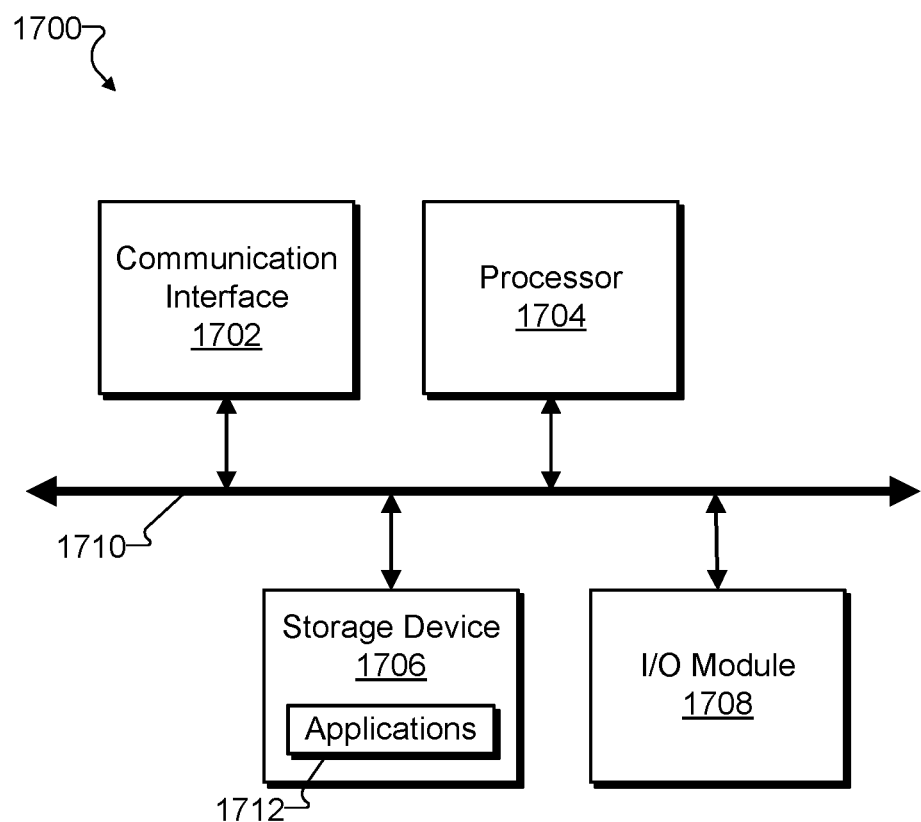
FIG. 17 illustrates an exemplary computing device according to principles described herein.

FIG. 17 illustrates an exemplary computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual reality experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with communication facility 402, tracking facility 404, or virtual reality media content presentation facility 406 (see FIG. 4). Likewise, storage facility 408 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   presenting, by a virtual reality media system on a display screen of a media player device associated with a user, a field of view of an immersive virtual reality world, wherein the field of view includes content of the immersive virtual reality world and dynamically changes in response to user input provided by the user as the user experiences the immersive virtual reality world;
   detecting, by the virtual reality media system, that a gaze of the user is directed for a predetermined amount of time at a gaze target included within the field of view, the gaze target comprising an object integrated into the content of the immersive virtual reality world and the detecting including
      tracking a gaze reticle within the field of view that is invisible to the user as the user experiences the immersive virtual reality world through the field of view,
      determining, based on the tracking, that the gaze reticle is directed at the gaze target,
      determining, based on the tracking, that the gaze reticle remains persistently directed at the gaze target for the predetermined amount of time,
      displaying, within the field of view based on the determining that the gaze reticle is directed at the gaze target, a graphical indicator indicating that the gaze of the user is currently directed at the gaze target, the graphical indicator presented at a persistent location in the field of view associated with the gaze reticle, and
      indicating, within the field of view and by way of the graphical indicator concurrently with the determining that the gaze reticle remains persistently directed at the gaze target for the predetermined amount of time, a running time that has elapsed toward the predetermined amount of time; and
   presenting, by the virtual reality media system in response to the detecting that the gaze of the user is directed for the predetermined amount of time at the gaze target, an interactive user interface associated with the gaze target, the interactive user interface presented within the field of view together with the content of the immersive virtual reality world.

2. The method of claim 1, wherein the object comprised in the gaze target is a virtual object.

3. The method of claim 2, wherein the interactive user interface associated with the gaze target includes information not presented to the user within the field of view outside of the interactive user interface, the information associated with the virtual object.

4. The method of claim 1, wherein the gaze target is graphically highlighted to stand out from other content of the immersive virtual reality world surrounding the gaze target.

5. The method of claim 1, wherein the gaze reticle is persistently centered within the field of view with respect to at least one of a vertical dimension of the field of view and a horizontal dimension of the field of view.

6. The method of claim 1, wherein:
   the immersive virtual reality world is associated with a virtual reality media program, the virtual reality media program including a beginning and an end;
   the virtual reality media program is presented to the user over a period of time as a current playback point of the virtual reality media program progresses from the beginning of the virtual reality media program to the end of the virtual reality media program; and
   the interactive user interface associated with the gaze target includes a gaze-selectable control that, when selected by the user, adjusts the current playback point of the virtual reality media program as the current playback point progresses from the beginning of the virtual reality media program to the end of the virtual reality media program.

7. The method of claim 1, wherein the interactive user interface associated with the gaze target includes a gaze-selectable control, the method further comprising:

detecting, by the virtual reality media system in response to the presenting of the interactive user interface within the field of view, that the gaze of the user is directed at the gaze-selectable control for a second predetermined amount of time; and performing, by the virtual reality media system based on the detecting that the gaze of the user is directed at the gaze-selectable control for the second predetermined amount of time, an operation associated with the gaze-selectable control.

8. The method of claim 1, wherein the interactive user interface associated with the gaze target includes a game that is controlled exclusively by one or more gaze-based gestures.

9. The method of claim 1, wherein:
the interactive user interface is semi-transparent; and
the presenting of the interactive user interface within the field of view together with the content of the immersive virtual reality world includes superimposing the semi-transparent interactive user interface over the content of the immersive virtual reality world such that the content of the immersive virtual reality world behind the interactive user interface can be at least partially viewed by the user.

10. The method of claim 1, further comprising:
receiving, by the virtual reality media system, data representative of camera-captured real-world scenery, the data representative of the camera-captured real-world scenery captured by at least one video camera arranged to capture a 360-degree image of the real-world scenery around a center point corresponding to the video camera; and
generating, by the virtual reality media system based on the received data representative of the camera-captured real-world scenery, the immersive virtual reality world.

11. The method of claim 1, wherein:
the user input provided by the user includes a change to an orientation of the display screen of the media player device with respect to at least one axis of at least two orthogonal axes;
the media player device is configured to detect the change to the orientation of the display screen as the user experiences the immersive virtual reality world; and
the dynamic changing of the content included within the field of view includes changing the content to represent a view of the immersive virtual reality world that is determined to be visible from a viewpoint of the user within the immersive virtual reality world according to the change to the orientation of the display screen with respect to the at least one axis.

12. The method of claim 1, embodied as computer-executable instructions on at least one non-transitory computer-readable medium.

13. A method comprising:
presenting, by a virtual reality media system on a display screen of a media player device associated with a user, a field of view of an immersive virtual reality world, wherein the field of view includes content of the immersive virtual reality world and dynamically changes in response to user input provided by the user as the user experiences the immersive virtual reality world;
detecting, by the virtual reality media system, that a gaze of the user is directed for a first predetermined amount of time at a gaze target included within the field of view, the gaze target comprising an object integrated into the content of the immersive virtual reality world and the detecting including
tracking a gaze reticle within the field of view that is invisible to the user as the user experiences the immersive virtual reality world through the field of view,
determining, based on the tracking, that the gaze reticle is directed at the gaze target,
determining, based on the tracking, that the gaze reticle remains persistently directed at the gaze target for the predetermined amount of time,
displaying, within the field of view based on the determining that the gaze reticle is directed at the gaze target, a graphical indicator indicating that the gaze of the user is currently directed at the gaze target, the graphical indicator presented at a persistent location in the field of view associated with the gaze reticle, and
indicating, within the field of view and by way of the graphical indicator concurrently with the determining that the gaze reticle remains persistently directed at the gaze target for the predetermined amount of time, a running time that has elapsed toward the predetermined amount of time;
presenting, by the virtual reality media system in response to the detecting that the gaze of the user is directed for the first predetermined amount of time at the gaze target, an interactive user interface associated with the gaze target, the interactive user interface presented within the field of view together with the content of the immersive virtual reality world and including a gaze-selectable control;
detecting, by the virtual reality media system while the interactive user interface is being presented within the field of view, that the gaze of the user is directed at the gaze-selectable control for a second predetermined amount of time; and
performing, by the virtual reality media system based on the detecting that the gaze of the user is directed at the gaze-selectable control for the second predetermined amount of time, an operation associated with the gaze-selectable control.

14. The method of claim 13, embodied as computer-executable instructions on at least one non-transitory computer-readable medium.

15. A system comprising:
at least one physical computing device that:
presents, on a display screen of a media player device associated with a user, a field of view of an immersive virtual reality world, wherein the field of view includes content of the immersive virtual reality world and dynamically changes in response to user input provided by the user as the user experiences the immersive virtual reality world;
detects that a gaze of the user is directed for a predetermined amount of time at a gaze target included within the field of view, the gaze target comprising an object integrated into the content of the immersive virtual reality world and the detection performed by
tracking a gaze reticle within the field of view that is invisible to the user as the user experiences the immersive virtual reality world through the field of view,
determining, based on the tracking, that the gaze reticle is directed at the gaze target, determining, based on the tracking, that the gaze reticle remains persistently directed at the gaze target for the predetermined amount of time, displaying, within the field of view based on the determining that the gaze reticle is directed at the gaze target, a graphical indicator indicating that the gaze of the user is currently directed at the gaze target, the graphical indicator presented at a persistent location in the field of view associated with the gaze reticle, and indicating, within the field of view and by way of the graphical indicator concurrently with the determining that the gaze reticle remains persistently directed at the gaze target for the predetermined amount of time, a running time that has elapsed toward the predetermined amount of time; and presents, in response to the detection that the gaze of the user is directed for the predetermined amount of time at the gaze target, an interactive user interface associated with the gaze target, the interactive user interface presented within the field of view together with the content of the immersive virtual reality world.

16. The system of claim 15, wherein the gaze reticle is persistently centered within the field of view with respect to at least one of a vertical dimension of the field of view and a horizontal dimension of the field of view.

17. The system of claim 15, wherein the object comprised in the gaze target is a virtual object.

18. The system of claim 17, wherein the interactive user interface associated with the gaze target includes information not presented to the user within the field of view outside of the interactive user interface, the information associated with the virtual object.

19. The system of claim 15, wherein the gaze target is graphically highlighted to stand out from other content of the immersive virtual reality world surrounding the gaze target.

20. The system of claim 15, wherein the at least one physical computing device further:

receives data representative of camera-captured real-world scenery, the data representative of the camera-captured real-world scenery captured by at least one video camera arranged to capture a 360-degree image of the real-world scenery around a center point corresponding to the video camera; and generates, based on the received data representative of the camera-captured real-world scenery, the immersive virtual reality world.

\* \* \* \* \*